United States Patent [19]
Watanabe et al.

[11] Patent Number: 5,091,853
[45] Date of Patent: Feb. 25, 1992

[54] CHAINED ADDRESSING MODE PIPELINED PROCESSOR WHICH MERGES SEPARATELY DECODED PARTS OF A MULTIPLE OPERATION INSTRUCTION

[75] Inventors: Tetsuya Watanabe; Toyohiko Yoshida, both of Itami, Japan

[73] Assignee: Mitsubishi Denki Kabushiki Kaisha, Tokyo, Japan

[21] Appl. No.: 314,727

[22] Filed: Feb. 22, 1989

[30] Foreign Application Priority Data

Mar. 18, 1988 [JP] Japan .................. 63-66267

[51] Int. Cl.[5] .......................................... G06F 9/35
[52] U.S. Cl. ............................ 395/375; 364/259.9; 364/254.1; 364/262.1; 364/251.5; 364/DIG. 1
[58] Field of Search ... 364/200 MS File, 900 MS File

[56] References Cited

U.S. PATENT DOCUMENTS

| | | | |
|---|---|---|---|
| 3,943,495 | 3/1976 | Garlic | 364/200 |
| 3,946,366 | 3/1976 | Edwards | 364/200 |
| 3,953,833 | 4/1976 | Shapiro | 364/200 |
| 4,206,503 | 6/1980 | Woods | 364/200 |
| 4,241,397 | 12/1980 | Strecker et al. | 364/200 |
| 4,453,212 | 6/1984 | Gaither | 364/200 |
| 4,503,492 | 3/1985 | Pilat | 364/200 |
| 4,530,050 | 7/1985 | Fukunaga | 364/200 |
| 4,613,935 | 9/1986 | Couleur | 364/200 |
| 4,616,313 | 10/1986 | Aoyagi | 364/200 |
| 4,651,274 | 3/1987 | Omoda | 364/200 |
| 4,733,344 | 3/1988 | Watanabe | 364/200 |
| 4,750,112 | 6/1988 | Jones | 364/200 |
| 4,794,518 | 12/1988 | Mizushima | 364/200 |
| 4,802,113 | 1/1989 | Onishi | 364/900 |
| 4,807,122 | 2/1989 | Baba | 364/200 |
| 4,823,258 | 4/1989 | Yamazaki | 364/200 |
| 4,837,676 | 6/1989 | Rosman | 364/200 |
| 4,858,105 | 8/1989 | Kuriyama | 364/200 |
| 4,890,218 | 12/1989 | Bram | 364/200 |
| 4,890,220 | 12/1989 | Nakagawa | 364/200 |
| 4,945,511 | 7/1990 | Itomitsu | 364/900 |
| 4,959,778 | 9/1990 | Miyadera | 364/200 |

OTHER PUBLICATIONS

"Branch Prediction Strategies and Branch Target Buffer Design," Lee, et al., *Computer*, vol. 17, No. 1, 1/84.

"Architecture of the TRON VLSI CPU," K. Sakamura, IEEE Micro, Apr. 1987.

*Primary Examiner*—Thomas C. Lee
*Assistant Examiner*—Eric Coleman
*Attorney, Agent, or Firm*—Townsend and Townsend

[57] ABSTRACT

A data processor of the present invention adopts a multi-stage indirect (chained) addressing mode, and merges pipeline processing units which are generated with respect to each designation of the chained addressing mode into a pipeline processing unit expressing the operation information for the operand of the instruction after completion of address calculation, thereby processing loads at each stage are equalized and processing speed as a whole apparatus increases.

3 Claims, 20 Drawing Sheets

(SERIAL BIT NUMBER)

0       7 8      15 16     23 24      31

(BIT NUMBER IN EACH BYTE)

N        N+1        N+2        N+3

(ADDRESS)

←LOW ADDRESS                HIGH ADDRESS→
←MSB SIDE                        LSB SIDE→

→→DIRECTION OF READ INSTRUCTION→→

Fig. 12
BYTE: 0       1
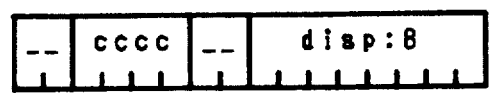
Fig. 13
(Sh) 
(Ea) 
Fig. 14
(Sh) 
(Ea) 

| INSTRUCTION BASIC PORTION | ADDRESSING EXTENTION PART |
|---|---|
| (2 BYTE) | (0~4 BYTE) |

×1~3 TIMES

| INSTRUCTION BASIC PORTION | (CHAINED ADDRESSING MODE+ADDRESSING EXTENTION PART)×nTIMES |
|---|---|
| (2 BYTE) | ((2 BYTE+0~4 BYTE)×n) |

×1~3 TIMES

BASIC INSTRUCTION FORMAT OF DATA
PROCESSOR OF THIS INVENTION

Fig. 34

| TIME | 1 | 2 | 3 | 4 | 5 | 6 | 7 |
|---|---|---|---|---|---|---|---|
| INSTRUC-TION QUEUE | 5th INSTRUCTION BIT PATTERN 105 / 4th INSTRUCTION BIT PATTERN 104 / 3rd INSTRUCTION BIT PATTERN 103 / 2nd INSTRUCTION BIT PATTERN 102 | 5th INSTRUCTION BIT PATTERN 105 | | | | | |
| D STAGE | 1st INSTRUCTION BIT PATTERN 101 | 2nd,3rd,4th INSTRUCTION BIT PATTERN 102,103,104 | 5th INSTRUCTION BIT PATTERN 105 | 5th INSTRUCTION BIT PATTERN 105 | — | — | — |
| A STAGE | — | 1st INSTRUCTION BIT PATTERN 101 | 1st,2nd,3rd,4th INSTRUCTION BIT PATTERN 101,102,103,104 | 1st,2nd,3rd,4th INSTRUCTION BIT PATTERN 101,102,103,104 | 1st,2nd,3rd,4th,5th INSTRUCTION BIT PATTERN 101,102,103,104,105 | — | — |
| F STAGE | — | — | — | — | — | 1st,2nd,3rd,4th,5th INSTRUCTION BIT PATTERN 101,102,103,104,105 | — |
| E STAGE | — | — | — | — | — | — | 1st,2nd,3rd,4th,5th INSTRUCTION BIT PATTERN 101,102,103,104,105 |

Fig. 36

| TIME | 1 | 2 | 3 | 4 | 5 |
|---|---|---|---|---|---|
| INSTRUC-TION QUEUE | ... <br> 9th INSTRUCTION BIT PATTERN 109 <br> 8th INSTRUCTION BIT PATTERN 108 <br> 7th INSTRUCTION BIT PATTERN 107 | ••••••• | ••••••• | ••••••• | ••••••• |
| D STAGE | 6th INSTRUCTION BIT PATTERN 106 | 7th, 8th, 9th INSTRUCTION BIT PATTERN 107, 108, 109 | — | — | — |
| A STAGE | — | 6th INSTRUCTION BIT PATTERN 106 | 6th, 7th, 8th, 9th INSTRUCTION BIT PATTERN 106, 107, 108, 109 | — | — |
| F STAGE | — | — | — | 6th, 7th, 8th, 9th INSTRUCTION BIT PATTERN 106, 107, 108, 109 | — |
| E STAGE | — | — | — | — | 6th, 7th, 8th, 9th INSTRUCTION BIT PATTERN 106, 107, 108, 109 |

CHAINED ADDRESSING MODE PIPELINED PROCESSOR WHICH MERGES SEPARATELY DECODED PARTS OF A MULTIPLE OPERATION INSTRUCTION

BACKGROUND OF THE INVENTION

1. Field of the Invention

The present invention relates to a data processor, and to be further detailed, relates to a data processor realizing a high processing ability by means of a sophisticated pipeline processing mechanism.

2. Description of the Prior Art

With the development of the length of bits whereby processing of the data processor is performed from four bits, via 8 bits and 16 bits, to 32 bits, the method of designating the addressing mode, that is, the method of computing the execution address from the address designating part of an instruction has been diversified.

For example, disclosure is made on a data processing system for processing an instruction having a general-purpose addressing mode in the U.S. Pat. No. 4,241,397. An instruction processed by the central processing unit of this data processing system has a system as shown in FIG. 1.

Each instruction comprises an operation code 80 and operand specifiers 81, 82 and 83 which are information of designating addresses, and each operand specifiers comprises at least one data byte. FIG. 1 shows an example of an operand having three operand specifiers.

Each operand specifier consists of two fields. The high-order bits thereof which configurate a register mode field 84 can designate address modes from 0 to 15 as shown in FIG. 1, and the low-order bits thereof which configurate a register address field 85, can designate general-purpose registers. When an index address mode is specified like 84A for the register mode field of the operand specifier 83, one of the general-purpose registers to be used as an index register in processing the operand specifier is specified for the register field 85A corresponding to that mode. A secondary operand specifier is included in an instruction of index address operation.

This secondary operand specifier gives the base address whereto the content of the designated index register.

Thus, address calculation of this central processing unit takes-in the content of the index register designated by the first byte of the operand specifier, generates an address based on information which is comprised in the second byte and the following bytes of the operand specifier, compounds it with the content of the index register designated by the first byte, and thereby generates an address of an operand.

FIG. 2 is a diagram showing a pipeline configuration of a conventional data processor.

First, prefetching of an instruction is performed by an instruction prefetch circuit 86. Subsequently, the prefetched instruction is sequentially decoded by an instruction buffer decoding circuit 87. Then, an address of an operand is calculated by address calculation and an operand fetching circuit 88 and fetching of the operand is performed, and operation of the instruction is executed by an operation execution circuit 89.

When the index address mode is designated in the conventional data processor as mentioned above, firstly information relating to the index of the operand specifier is decoded by the instruction buffer decoding circuit 87, subsequently decoding of information comprised in the second byte and the following bytes of the operand specifier is completed, thereafter the actual address calculation is performed by the address calculation and the operand fetch circuit 88, and execution of operation is performed by the operation execution circuit 89. This means that the index value is precedingly decode-processed, and therefore information relating to the base value is obtained after that, and the address calculation can not be made while performing decoding processing.

SUMMARY OF THE INVENTION

To solve the above-mentioned problem, a data processor in accordance with the present invention has a chained addressing mode which is a high-performance addressing mode. Address calculation of the multi-stage indirect mode is performed in a manner that calculation of a base value is made by taking-in the base value, information relating to the index is taken in, and an address of an operand is generated by adding the index value. This chained addressing mode can also designate a memory indirect reference addressing mode, and can be arbitrarily combined with this with operations of addition and indirect reference taken as primitives of addressing, and therefore this is an addressing mode capable of indirect reference of an arbitrary number of times.

This is a data processor capable of processing also for the addressing in which the address calculation comprising memory indirect reference of an arbitrary number of times can be performed. In addition, the data processor of the present invention adopts a system in executing data operation by a pipeline processing and is configurated so that load of each processing of each constituent of the pipeline processing becomes balanced.

The data processor of the present invention consists of an instruction fetch unit, an instruction decoding unit, an address calculation unit, an operand fetch unit and an instruction operation execution unit, and provides a pipeline processing system which performs processing by dividing one instruction into a plurality of pipeline processing units in the decoding stage, executes the pipeline processing unit of information relating to address calculation of the instruction for each designating of the above-mentioned chained addressing mode, and comprises a means for merging it into the pipeline processing unit of operation information for the operand of that instruction after address calculation has finished.

In the data processor of the present invention configurated as described above, the processing in the case of an instruction that address designating of the operand is made by the chained addressing mode, first, in the decoding stage, a two-byte instruction base part is decoded, and is sent to the stage where address calculation is performed as one pipeline processing unit. Then, a "chained addressing mode+addressing extension part of 0–4 bytes" is decoded, and is sent to the stage where address calculation is performed as one pipeline processing unit. At this time, if a plurality of "chained addressing mode+addressing extension part of 0–4 bytes" exist, a plurality of pipeline processing units are sent to the stage where address calculation is performed. Next, in the stage where address calculation is performed, a pipeline processing unit of the instruction base part of two bytes is processed, and the pipeline processing unit of the following "chained addressing mode+addressing extension part of 0-4 bytes is processed, and in the case where a plurality of pipeline processing units of "chained addressing mode+addressing extension part of 0-4 bytes" exist, they are processed one after another, and when the processing is completed, that is, when address calculation of one operand is completed, the results of these processings are sent to the stage where fetching of the operand is performed as one pipeline processing unit.

The above and further objects and features of the invention will more fully be apparent from the following detailed description with accompanying drawings.

BRIEF DESCRIPTION OF THE DRAWINGS

FIG. 12 is a schematic diagram showing an instruction format of short branch, FIG. 13 is a schematic diagram showing a format wherein an addressing mode designating part is of a register direct mode, FIG. 14 is a schematic diagram showing a format wherein an addressing mode designating part is of a register indirect mode, FIG. 34 is a schematic diagram showing processing flows of step code in a pipeline processing mechanism, FIG. 36 is a schematic diagram showing processing flows of step code in a pipeline processing mechanism.

DESCRIPTION OF THE PREFERRED EMBODIMENTS

Hereinafter, detailed description is made on the present invention based on drawings showing one embodiment thereof.

(1) Instruction Format of Data Processor of the Present Invention

An instruction of a data processor of the present invention is formed on a 16-bit unit basis, being variable in length, and no instruction of odd bytes is used herein.

The data processor of the present invention has instruction formats specifically devised for the purpose of executing at high speed a highly frequent instruction in a short format. For example, as to a two-operand instruction, two formats are provided; a general-type format which has basically a configuration of "four bytes+extension part(s)" and allows the utilization of all addressing modes and a reduced-type format allowing only the use of a highly frequent instruction and an addressing mode.

The meanings of symbols expressing in the instruction format of the data processor of the present invention shown in FIG. 3 to FIG. 12 are as follows:

—: Portion wherein operation code is put.

: Portion wherein literal or immediate value is put.

Ea: Portion for generating an operand in a general-type 8-bit addressing mode.

Sh: Portion for designating an operand in a reduced-type 6-bit addressing mode.

Rn: Portion for designating an operand in a register by the register number.

Figure 1:
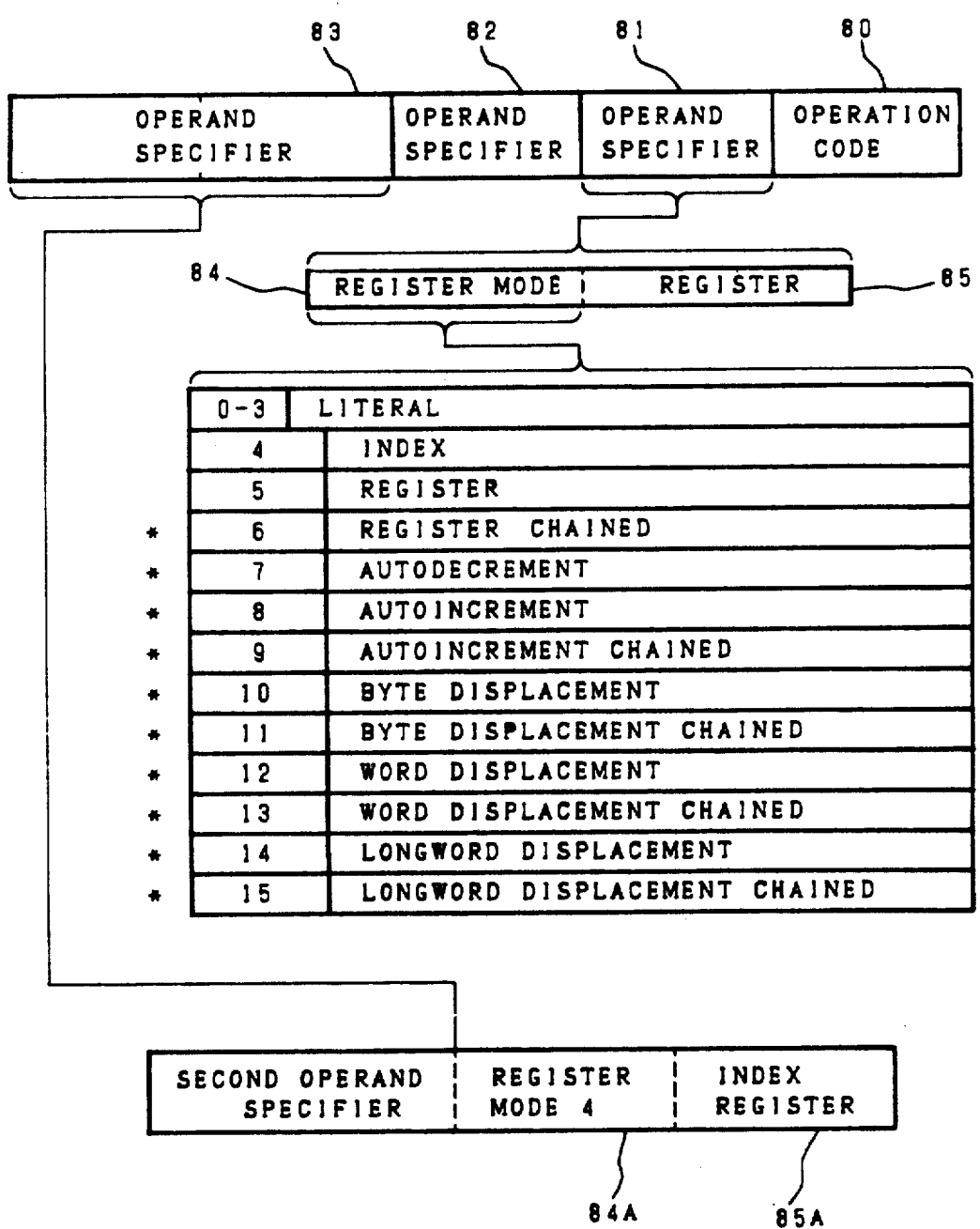
FIG. 1 is a schematic diagram showing a instruction format in a conventional data processor.
Figure 2:
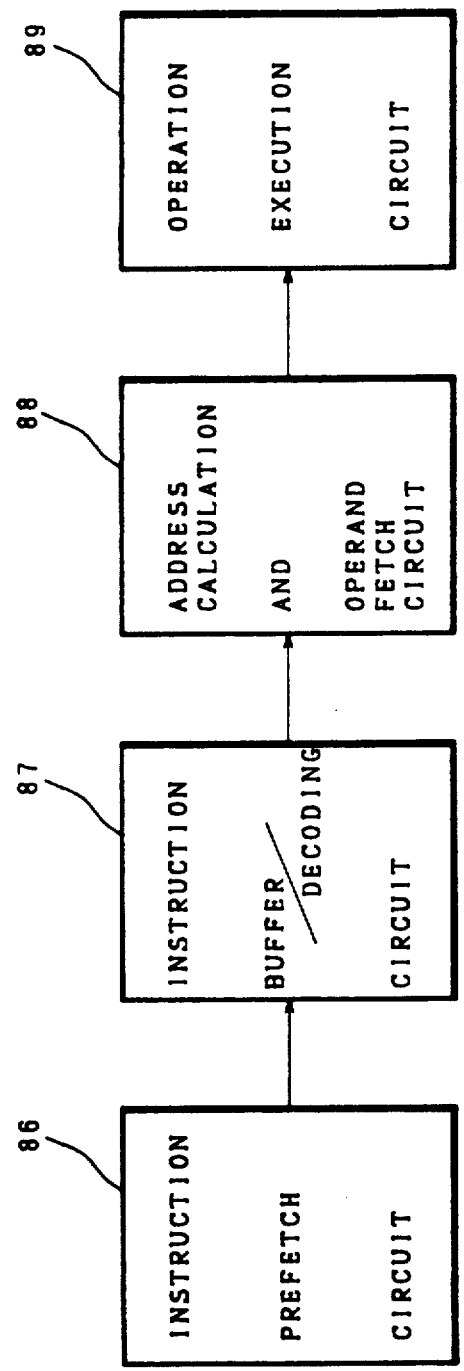
FIG. 2 is a block diagram showing a configuration of a pipeline processing mechanism in a conventional data processor.
Figure 3:
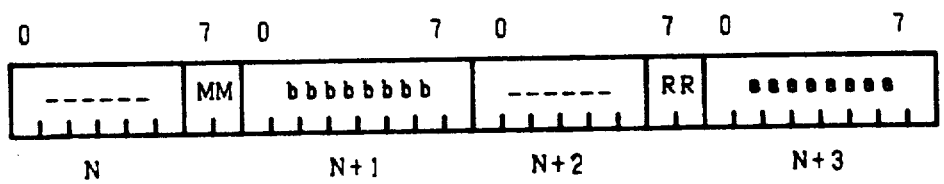
FIG. 3 is a schematic diagram showing a typical form of an instruction format of a data processor in accordance with the present invention.

In the format, as shown in FIG. 3, the right side is the LSB side and is high address. The instruction format can be discriminated only after an address N and an address N+1 are checked, and as described above, this is because of a premise that the instruction is fetched and decoded on a 16-bit (2-byte) unit basis without fail.

In the data processor of the present invention, in the case with any format, the extension part of Ea or Sh of each operand is sure to be positioned immediately after a half word comprising the basic part of that Ea or Sh. This takes precedence over the immediate value data specified implicitly by the instruction or the extension part of the instruction. Accordingly, as to an instruction of four or more bytes, there are cases where the operation code of the instruction is divided by the extension part of Ea.

Also, as described later, where another extension part is further attached to the extension part of Ea by a chained addressing mode, this part takes precedence over the next instruction. For example, consideration is made on the case of 6-byte instruction which comprises Ea1 in a first half word, Ea2 in a second half word, and ends with a third half word. Since the chained addressing mode is used for Ea1, another extension part of the chained addressing mode is assumed to be attached in addition to the ordinary extension part, and then the actual instruction bit pattern is composed in the sequence of the first word of instruction (including the basic part of Ea1), the expansion part of Ea1, the chained addressing mode extension part, the second half word of instruction (including the basic part of Ea2), the expansion part of Ea1 and the third half word of instruction.

In addition, detailed description of contents of the instruction formats above-mentioned are described in "The Method of Allocation of the Instruction Bits for the TRON Specification Chip", by K. Sakamura, Documents of the Third Real Time Architecture TRON Seminar, Japanese Electronic Information Community Society.

(1.1) Reduced-Type Two Operand Instruction

FIG. 4 through FIG. 7 are schematic diagrams showing reduced-type formats of the two-operand instruction.

Figure 4:
FIG. 4 is a schematic diagram showing a reduced-type format of an operational instruction between memory and register.

FIG. 4 is a schematic diagram showing a format of an operational instruction between memory and register. This format includes a L-format wherein the source operand side is a memory and a S-format wherein the destination operand side is a memory.

In the L-format, symbol Sh represents the designating field of the source operand, symbol Rn represents the designating field of the register of the destination operand and RR represents designating of the operand size of Sh, respectively. The size of the destination operand taken into the register is fixed to 32 bits. Where the size of the resister side differs from that of the memory side and the size of the source side is smaller, sign extension is performed.

In the S-format, symbol Sh represents the designating field of the destination operand, symbol Rn represents the register designating field of the source operand and RR represents designating of the operand size of Sh, respectively. The size of the source operand taken into the register is fixed to 32 bits. Where the size of the register side differs from that of the memory side and the size of the source side is larger, truncating of the overflow portion and overflow check are performed.

Figure 5:
FIG. 5 is a schematic diagram showing a reduced-type format of an operational instruction between register and register.

FIG. 5 is a schematic diagram showing a format of an operational instruction between register and register (R-format). Symbol Rn represents the designating field of the destination register, and symbol Rm represents the designating field of the source register. The operand size is 32 bits only.

Figure 6:
FIG. 6 is a schematic diagram showing a reduced-type format of an operational instruction between literal and memory.

FIG. 6 is a schematic diagram showing a format of an operational instruction between literal and memory (Q-format). Symbol MM shows the designating field of the destination operand size, ### shows the designating field of the source operand by literal, and symbol Sh shows the designating field of the destination operand.

Figure 7:
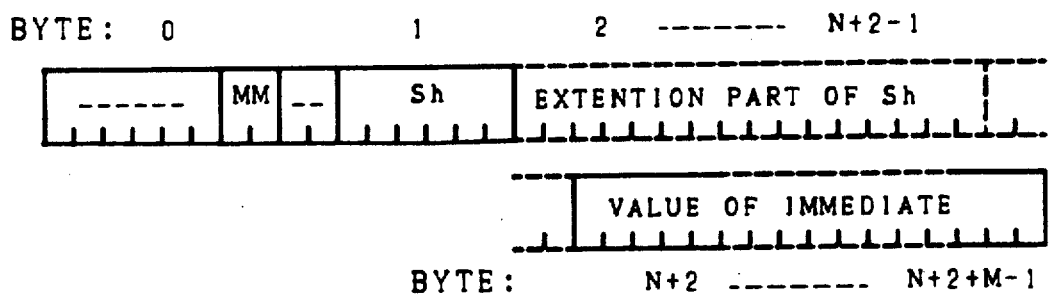
FIG. 7 is a schematic diagram showing a reduced-type format of an operational instruction between immediate value and memory.

FIG. 7 is a schematic diagram showing a format of an operational instruction between immediate value and memory (I-format). Symbol MM represents the designating field of the operand size (common in source and destination), and symbol Sh represents the designating field of the destination operand. The sizes of the immediate value of the I-format are 8, 16 and 32 bits in common with the sizes of the operand of the destination side, and zero extension and sign extension are not performed.

(1.2) General-Type One-Operand Instruction

Figure 8:
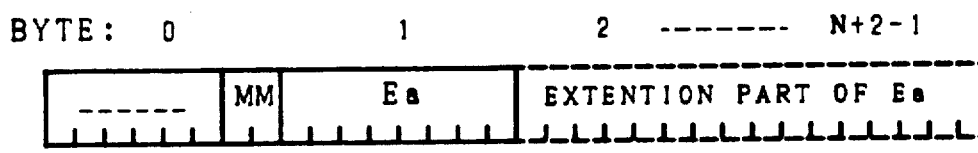
FIG. 8 is a schematic diagram showing a general-type format of a one-operand instruction.

FIG. 8 is a schematic diagram showing a general-type format of one-operand instruction (G1-format). Symbol MM represents the designating field of the operand size. Some of the G1-format instructions comprise an extension part besides the extension part of Ea. There are also instructions using no MM.

(1.3) General-Type Two-Operand Instruction

Figure 9:
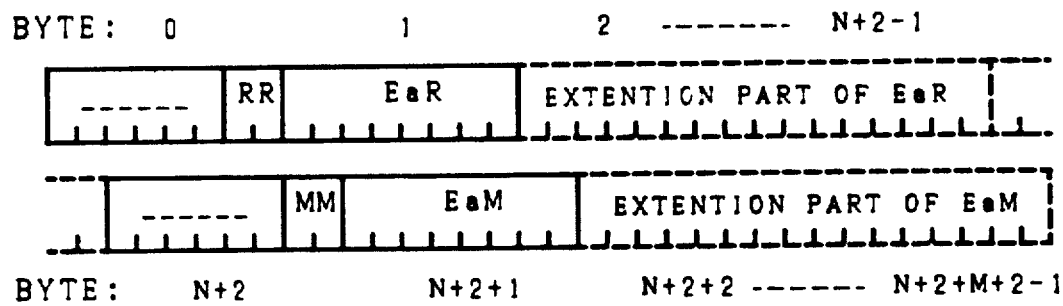
FIG. 9 is a schematic diagram showing a general-type format of a two-operand instruction wherein a first operand instruction necessitates memory read-out.
Figure 10:
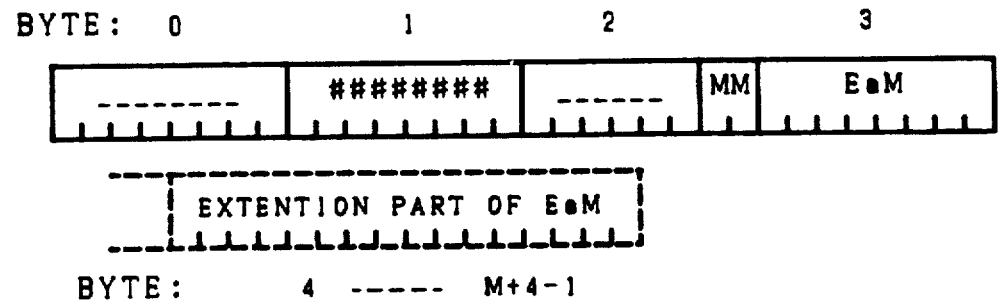
FIG. 10 is a schematic diagram showing a general-type format of a two-operand instruction wherein a first operand is an eight-bit immediate value.
Figure 11:
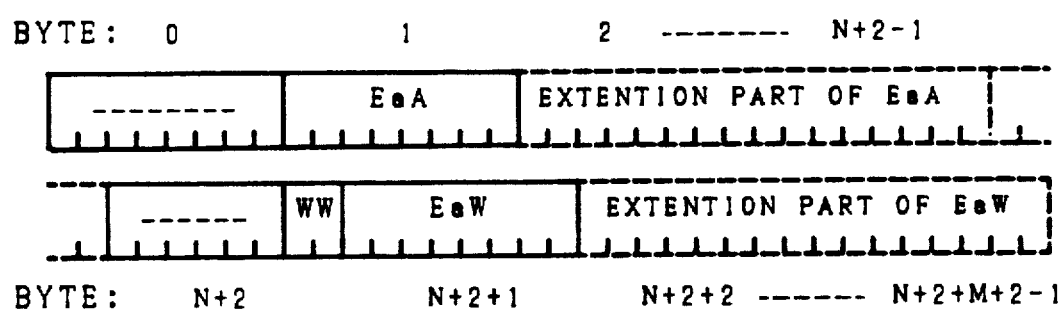
FIG. 11 is a schematic diagram showing a general-type format of a two-operand instruction wherein a first operand is only address calculation.

FIG. 9 through FIG. 11 are schematic diagrams showing general-type formats of two-operand instruction. This format comprises an instruction having a maximum of two operands of the general-type addressing mode which are designated by eight bits. There are cases where the total number itself of operands becomes three or more.

FIG. 9 is a schematic diagram showing a format of an instruction wherein a first operand necessitates memory read-out (G-format). Symbol EaM represents the designating field of the destination operand, symbol MM represents the designating field of the destination operand size, EaR represents the designating field of the source operand, and RR represents the designating field of the source operand size. Some of the G-format instructions comprise an extension part besides the extension part of EaR.

FIG. 10 is a schematic diagram showing a format of an instruction wherein a first operand is an instruction of eight-bit immediate value (E-format). Symbol EaM represents the designating field of the destination operand, symbol MM represents the designating field of the destination operand size, and ## ... represents the source operand value.

The E-format and the I-format have similar functions, but their conceptions greatly differ from each other. Specifically, the E-format is coherently of a type derived from the general type of two-operand (G-format), the size of source operand is eight-bit fixed, and the size of destination operand is selected from among 8, 16 and 32 bits. This means that the E-format presupposes operation between different sizes, and the source operand of eight bits is zeroextended or sign-extended in a manner of agreeing with the size of the destination operand. On the other hand, the I-format is of a type that the patterns of immediate value having high frequency particularly in the transfer instruction and the comparison instruction are shortened, and the sizes of the source operand and the destination operand are equal.

FIG. 11 is a schematic diagram showing a format of an instruction wherein a first operand is only address calculation. Symbol EaW represents the designating field of the destination operand, symbol WW represents the designating field of the destination operand size, and symbol EaA represents the designating field of the source operand. For the source operand, the calculation result itself of effective address is used.

FIG. 12 is a schematic diagram showing a format of a short branch instruction. Symbol cccc represents the designating field of branch condition, symbol disp:8 represents the designating field of displacement to a jump destination, and in the data processor of the present invention, when displacement is designated by eight bits, the displacement value is set by doubling the designated value in the bit pattern.

(1.4) Addressing Mode

The methods of designating the addressing mode of the data processor of the present invention include the reduced type designated by six bits including the register and the general type designating by eight bits.

Where an undefined addressing mode has been designated, or where a combination of addressing modes obviously unsuitable in the meaning has been designated, a reserved instruction exception is generated likewise the case where the undefined instruction has been executed, and exception processing is started.

Equivalents to the above include the case where the destination is the immediate value mode and the case where the immediate value mode is used in the designating field of the addressing mode to be accompanied by address calculation.

Meanings of symbols used in the format diagram shown in FIG. 13 to FIG. 23 is as follows:
Rn: Register designating
(Sh): Designating method by the reduced-type addressing mode of six bits
(Ea): Designating method by the general-type addressing mode of eight bits In the format diagram, the portion surrounded by a broken line shows the extension part.

(1.4.1) Basic Addressing Modes

The data processor of the present invention supports various addressing modes. Among them, the basic addressing modes supported by the data processor of the present invention include a register direct mode, a register indirect mode, a register relative indirect mode, an immediate value mode, an absolute mode, a Program Counter (PC) relative indirect mode, a stack pop mode and a stack push mode.

The register direct mode takes the content of register intact as an operand. FIG. 13 is a schematic diagram of the format thereof. Symbol Rn shows the number of the general-purpose register.

The register indirect mode takes the content of the memory whose address is the content of register as an operand. FIG. 14 is a schematic diagram of the format thereof. Symbol Rn shows the number of the general-purpose register.

Figure 15:
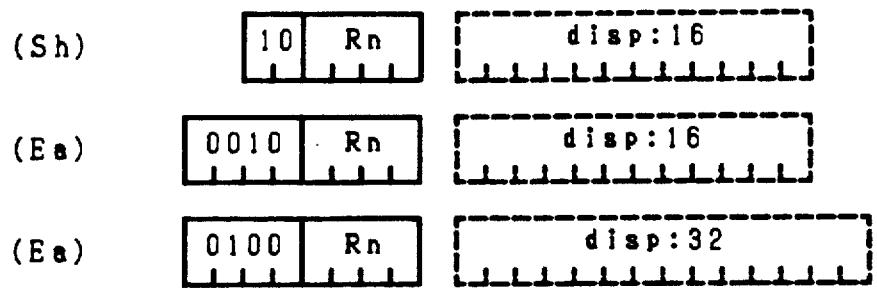
FIG. 15 is a schematic diagram showing a format wherein an addressing mode designating part is of a register relative indirect mode.

The register relative indirect mode includes two kinds of 16 bits and 32 bits of the displacement value. Each of them takes the content of the memory whose address is the value of the content of the register added to the displacement value of 16 bits or 32 bits as an operand. FIG. 15 is a schematic diagram of the format thereof. Symbol Rn shows the number of the general-purpose register. Symbol disp:16 and disp:32 show the displacement value of 16 bits and the displacement value of 32 bits, respectively. The displacement value is treated with a sign affixed.

Figure 16:
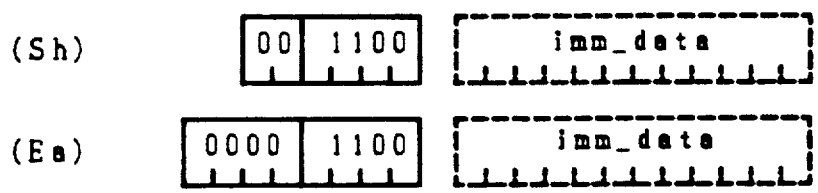
FIG. 16 is a schematic diagram showing a format wherein an addressing mode designating part is of an immediate value mode.

The immediate mode takes the bit pattern designated in the instruction code as an operand while assuming it intact as a binary number. FIG. 16 is a schematic diagram of the format thereof. Symbol imm_data shows the immediate value. The size of imm_data is designated in the instruction as the operand size.

Figure 17:
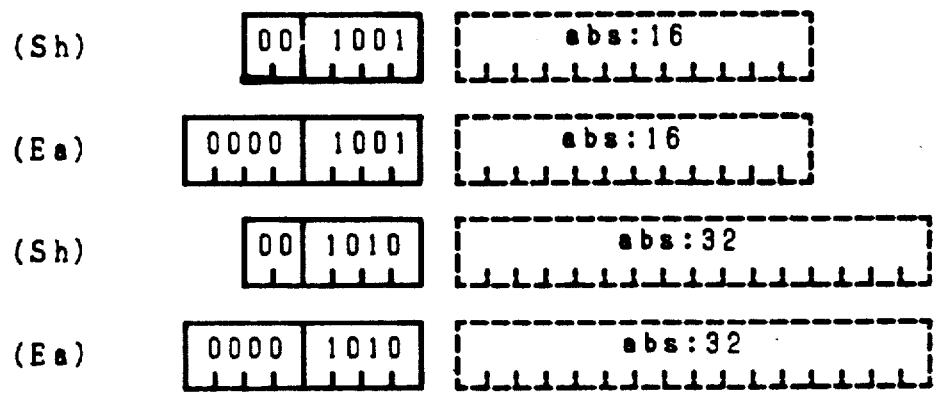
FIG. 17 is a schematic diagram showing a format wherein an addressing mode designating part is of an absolute mode.

The absolute mode includes two kinds of 16 bits and 32 bits for showing the address value. Each kind takes the content of the memory whose address is the bit pattern of 16 bits or 32 bits designated in the instruction code as an operand. FIG. 17 is a schematic diagram showing the format thereof. Symbols abs:16 and abs:32 show the address values of 16 bits and 32 bits, respectively. When the address is shown by abs:16, the designated address value is sign-extended to 32 bits.

Figure 18:
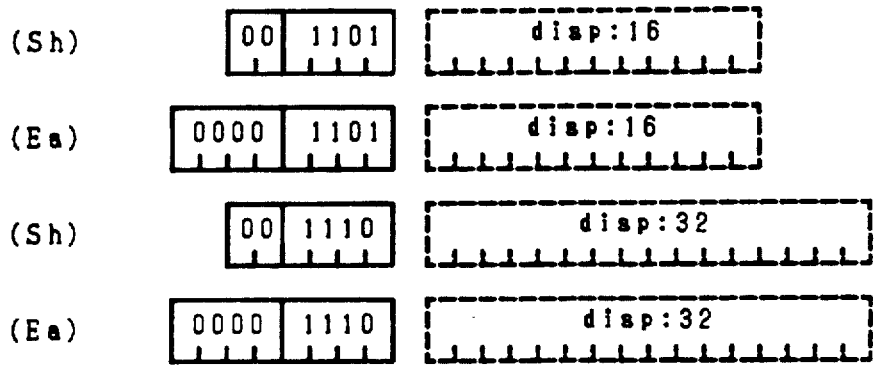
FIG. 18 is a schematic diagram showing a format wherein an addressing mode designating part is of a PC relative indirect mode.

The PC relative indirect mode includes two kinds of 16 bits and 32 bits of the displacement value. Each takes the content of the memory whose address is the value of the content of a program counter whereto the displacement value of 16 bits or 32 bits is added as an operand. FIG. 18 is a schematic diagram showing the format thereof. Symbols disp:16 and disp:32 show the displacement value of 16 bits and the displacement value of 32 bits, respectively. The displacement value is treated with a sign affixed. In the PC relative indirect mode, the value of the program counter to be referred is the head address of the instruction comprising the operand. Where the value of the program counter is referred in the chained addressing mode, the head address of the instruction is also used as a reference value of PC relatively.

Figure 19:
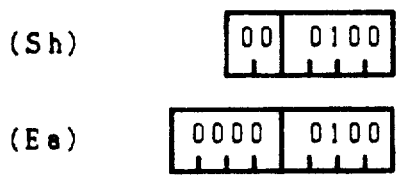
FIG. 19 is a schematic diagram showing a format wherein an addressing mode designating part is of a stack POP mode.

The stack pop mode takes the content of the memory whose address is the content of a stack pointer (SP) as an operand. After operand access, the SP is incremented by the operand size. For example, where 32-bit data is handled, the SP is renewed (incremented) by +4 after the operand access. Designating of the stack pop mode for operands of sizes of B and H can also be performed, and the SP is renewed (incremented) by +1 and +2, respectively. FIG. 19 is a schematic diagram of the format thereof. As to the one wherein the stack pop mode is invalid for the operand, a reserved instruction exception is generated. Specifically, the stack pop mode designating for a write operand and a read-modify-write operand becomes the reserve instruction exception.

Figure 20:
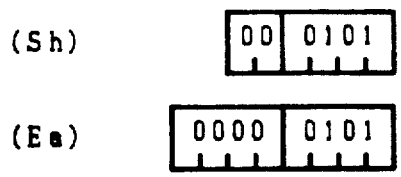
FIG. 20 is a schematic diagram showing a format wherein an addressing mode designating part is of a stack PUSH mode.

The stack push mode takes the content of the memory whose address is the content of the SP decremented by the operand size as an operand. In the stack push mode, the SP is decremented before operand access. For example, when handling 32-bit data, the SP is renewed (decremented) by −4 before operand access. It is also possible to designate the stack push mode for operands of sizes of B and H, and the SP is renewed (decremented) by −1 and −2, respectively. FIG. 20 is a schematic diagram showing the format thereof. As to the one wherein the stack push mode is invalid for the operand, and, a reserve instruction exception is generated. Specifically, the stack push mode designated for a read operand and a read-modify-write operand becomes the reserved instruction exception.

(1.4.2) Chained Addressing Mode

Addressing, whatever complicated, can basically be decomposed into combinations of addition and indirect reference. Accordingly, operations of addition and indirect reference are given in advance as primitives of addressing, and if they can be combined arbitrarily, any complicated addressing mode can be realized. The chained addressing mode of the data processor of the present invention is an addressing mode based on such a conception. A complicated addressing mode is particularly useful for data reference between modules or the processing system of AI (Artificial Intelligence) language.

When designating the chained addressing mode, in the basic addressing mode designated field, one from among three kinds of designating methods of a register base chained addressing mode, a PC base chained addressing mode and an absolute chained addressing mode is designated.

Figure 21:
FIG. 21 is a schematic diagram showing a format of a register base chained addressing mode.

The register base chained addressing mode is an addressing mode taking the value of register as the base value of the chained addressing to be extended. FIG. 21 is a schematic diagram showing the format thereof. Symbol Rn shows the number of the general-purpose register.

Figure 22:
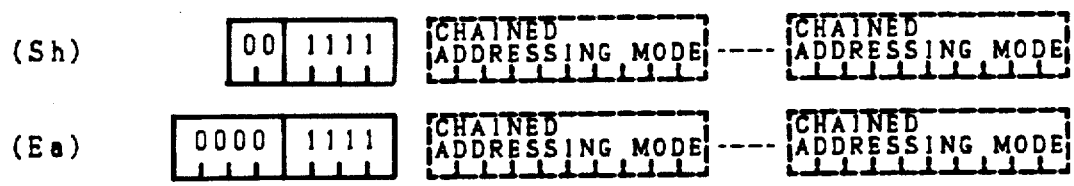
FIG. 22 is a schematic diagram showing a format of a PC base chained addressing mode.

The PC base chained addressing mode is an addressing mode taking the value of the program counter (PC) as the base value of the chained addressing to be extended. FIG. 22 is a schematic diagram showing the format thereof.

Figure 23:
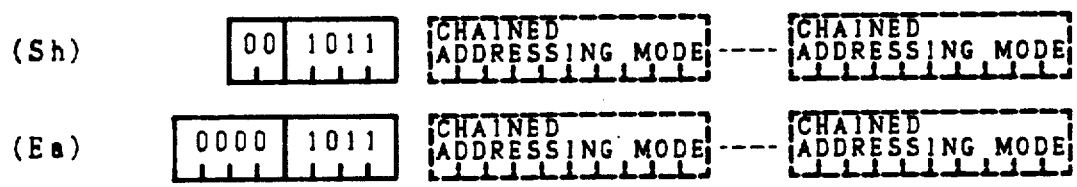
FIG. 23 is a schematic diagram showing a format of an absolute base chained addressing mode.

The absolute base chained addressing mode is an addressing mode taking zero as the base value of the chained addressing to be extended. FIG. 23 is a schematic diagram of the format thereof.

Figure 24:
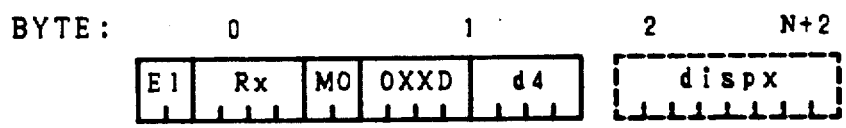
FIG. 24 is a schematic diagram showing designating fields for addition of displacement value, scaling and addition of index value, and indirect reference of memory in a format of one stage in a chained addressing mode.

The chained addressing mode designating field to be extended takes 16 bits as a unit, and this is repeated arbitrary times. By the chained addrssing mode of one stage, addition of displacement, scaling (×1, ×2, ×4, ×8) and addition of an index register, and indirect reference of a memory are performed. FIG. 24 is a schematic diagram showing the format of the chained addrssing mode. Each field has meanings as shown below.

E = 0: Chained addressing mode is continued.
E = 1: Address calculation ends.
  tmp → address of operand
I = 0: No memory indirect reference is performed.
  tmp + disp + Rx * Scale → tmp
I = 1: Memory indirect reference is performed.
  mem [tmp + disp + Rx * Scale] → tmp
M = 0: <Rx> is used as an index.
M = 1: Special index
  <Rx> = 0 Index value is not added. (Rx = 0)
  <Rx> = 1 Program counter is used as an index value. (Rx = PC)
  <Rx> = 2 ~ Reserved.

D = 0: The value of field d4 of four bits in the chained addressing mode is quadrupled to be taken as a displacement value, and this value is added. The d4 is treated with a sign affixed, and is used by surely quadrupling it irrespective of the size of the operand.

D = 1: The dispx (16/32 bits) designated in the extension part of the chained addressinf mode is taken as a displacement value, the size of the extension part whereto this value is added is designated in the d4 field.

d4 = 0001    dispx: 16 bits d4 = 0010    dispx: 32 bits

XX: Index scale (scale = 1/2/4/8)

Where scaling of ×2, ×4, ×8 has been performed for the program counter, an indefinite value is entered as an intermidiate value (tmp) after completion of processing of that stage. The effective address obtained by this chained addrssing mode becomes an unpredictable value, but no exception is generated. Designating of scaling for the program counter should not be performed.

Figure 25:
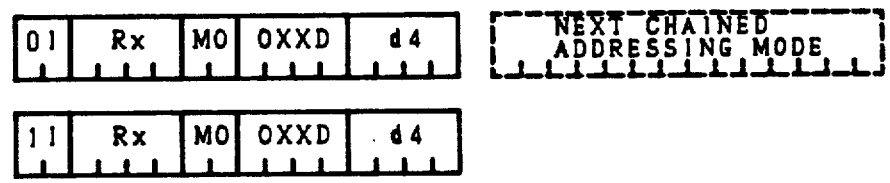
FIG. 25 is a schematic diagram showing a variation of whether or not the chained addressing mode is to be continued.
Figures 26, 29:
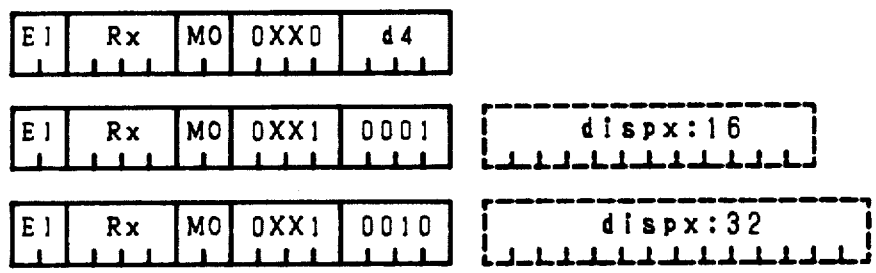
FIG. 26 is a schematic diagram showing a variation of size of displacement value.
FIG. 29 is a schematic diagram showing a basic instruction format of the data processor of the present invention.

FIGS. 25 and 26 show variations on the instruction format formed by the chained addressing mode. FIG. 25 shows variations of continuation and completion of the chained addressing mode. FIG. 26 shows variations on the size of displacement.

If the chained addressing mode of an arbitrary number of stages can be utilized, the case-sorting on a number of stages basis in the compiler can be dispensed with, and therefore an advantage of alleviating the burden on the compiler is obtainable. This is because, even if frequency of chained reference is very low, the compiler has to be able to generate a correct code without fail. For this reason, an arbitrary number of stages can be applied in the format.

(1.5) Exceptional Processing

The data processor of the present invention has abundant exceptional processing functions for alleviating software load. In the data processor of the present invention, there are three kinds of the exceptional processing, which are re-execution of instruction processing (named exception), completion of instruction processing (named trap) and interruption. In the data processor of the present invention, these three kinds of exceptional processings and system faults are generally called EIT.

(2) Configuration of Function Block

Figure 27:
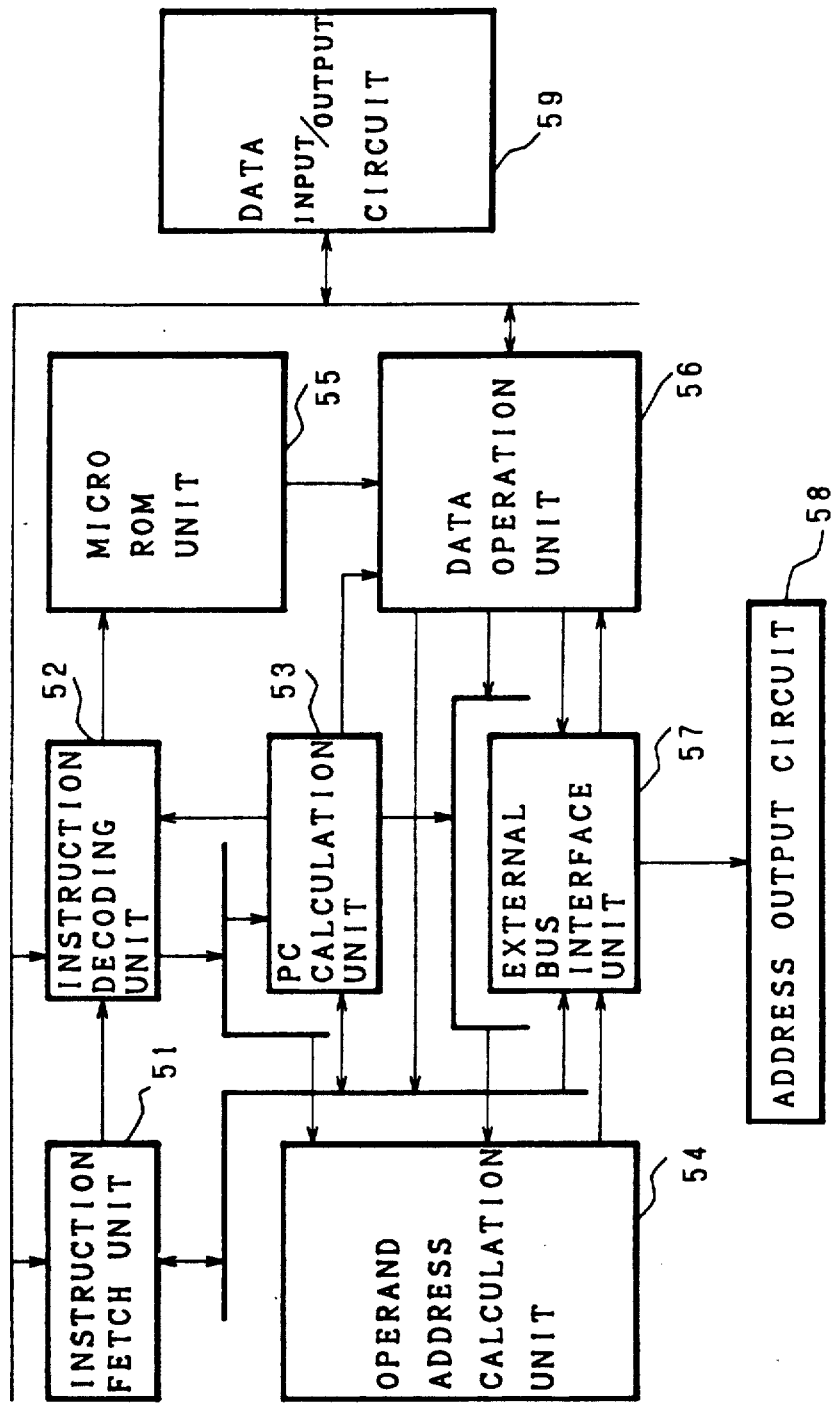
FIG. 27 is a block diagram showing a configuration of the data processor of the present invention.

FIG. 27 is a block diagram showing a configuration of the data processor of the present invention.

The interior of the data processor of the present invention is functionally divided roughly into an instruction fetch unit 51, an instruction decoding unit 52, a PC calculation unit 53, an operand address calculation unit 54, a micro ROM unit 55, a data operation unit 56 and an external bus interface unit 57.

In FIG. 27, in addition to the above-described units, an address output circuit 58 for outputting address to the exterior of a CPU and a data input/output circuit 59 for inputting and outputting data from and to the exterior of the CPU are shown being separated from the other function block units.

(2.1) Instruction Fetch Unit

The instruction fetch unit 51 which comprises a branch buffer, an instruction queue and a controlling unit thereof, determines the address of an instruction to be fetched next and fetches the instruction from the branch buffer or a memory outside the CPU. It also performs instruction registering to the branch buffer.

The branch buffer is small-scaled, therefore operating as a selective cache.

Detailed description on the operation of the branch buffer is disclosed in the Japanese Patent Application Laid-Open No. 63-56731 (1988).

The address of an instruction to be fetched next is calculated by a dedicated counter as the address of the instruction to be inputted to an instruction queue 1. In the case where a branch or jump is generated, an address of a new instruction is transferred from the PC calculation unit 53 or the data operation unit 56.

In the case where an instruction is fetched from a memory outside the CPU, the address of the instruction to be fetched is outputted from the address output circuit 58 to the outside of the CPU through the external bus interface unit 57, and an instruction code is fetched from the data input/output circuit 59. Then, among the instruction codes in buffering, the instruction code to be decoded next is outputted to the instruction decoding unit 52.

(2.2) Instruction Decoding Unit

In the instruction decoding unit 52, basically an instruction code is decoded on a 16-bit (half word) basis. This block comprises a FHW decoder for decoding an operation code included in the first half word, a NFHW decoder for decoding an operation code including in the second and the third half words, and an addressing mode decoder for decoding an addressing mode. These FHW decoder, NFHW decoder and addressing mode decoder are generally called a first decoder 2.

There are also a second decoder 3 which further decodes an output of the FHW decoder and the NFHW decoder and calculates an entry address of the micro ROM, a branch predicting mechanism for performing branch prediction of a conditional branch instruction, and an address calculation conflict checking mechanism for checking pipeline conflict in calculating an operand address.

The instruction decoding unit 52 decodes the instruction code being inputted from the instruction fetch unit 51 by 0-6 bytes per two clocks (one step). Among the results of decoding, information on operation in the data operation unit 56 is outputted to the micro ROM unit 55, information on operand address calculation is outputted to the operand address calculation unit 54, and information on PC calculation is outputted to the PC calculation unit 53, respectively.

(2.3) Micro ROM Unit

The micro ROM unit 55 comprises a micro ROM for storing microprograms which mainly controls the data operation unit 56, a micro sequencer, and a micro instruction decoder. A micro instruction is read out from the micro ROM once per two clocks (one step). The micro sequencer accepts processings of exception, interruption and trap (these three are generally called EIT) in a hardware manner in addition to the sequential processings shown by the microprograms. The micro ROM unit 55 also controls a store buffer. To the micro ROM unit 55, there are inputted flag information generated by interruption independent of the instruction code or by the result of operation execution, and output of an instruction decoding unit such as output of a second decoder 3. Output of the micro decoder is mainly performed to the data operation unit 56, but some information such as information of stopping other preceding processing due to execution of a jump instruction is outputted also to other blocks.

(2.4) Operand Address Calculation Unit

The operand address calculation unit 54 is controlled in a hardwired method by information on operand address calculation outputted from the address decoder of the instruction decoding unit 52 or the like. In this block, substantially all of processings on operand address calculation are performed. Checking is made for whether or not the address of memory access for memory indirect addressing and the operand address can be entered in an I/O area mapped in the memory.

The result of address calculation is sent to the external bus interface unit 57. The values of the general-purpose register and the program counter required for address calculation are inputted from the data operation unit.

In performing the memory indirect addressing, the memory address to be referred is outputted from the address output circuit 58 to the outside of the CPU through the external bus interface unit 57, and the indirect address value inputted from the data input/output unit 59 is fetched through the instruction decoding unit 52.

(2.5) PC Calculation Unit

The PC calculation unit 53 is controlled in a hardwired manner by information on PC calculation outputted from the instruction decoding unit 52, and calculates the PC value of an instruction. The data processor of the present invention has a variable-length instruction set, and the length of that instruction can be found only after the instruction is decoded. For this reason, the PC calculation unit 53 generates the PC value of the next instruction by adding the length of the instruction outputted from the instruction decoding unit 52 to the PC value of the instruction in decoding. In the case where the instruction decoding unit 52 decodes a branch instruction and directs a branch in the decoding stage, the PC value of a branch destination instruction is calculated by adding a branch displacement in place of the instruction length to the PC value of the branch instruction. In the data processor of the present invention, performing a branch in the instruction decoding stage in response to the branch instruction is called pre-branch.

On this pre-branch approach, detailed description is disclosed in the Japanese Patent Application Laid-Open No. 63-59630 (1988) and the Japanese Patent Application Laid-Open No. 63-55639 (1988).

The result of calculation in the PC calculation unit 53 is outputted as the PC value of each instruction together with the result of decoding of the instruction, and in addition, is outputted to the instruction fetch unit 51 as the address of the instruction to be decoded next at pre-branch. Also, it is used for the address for branch prediction of the instruction to be decoded next in the instruction decoding unit 52.

On the branch predicting approach, detailed description is disclosed in the Japanese Patent Application Laid-Open No. 63-175934 (1988).

(2.6) Data Operation Unit

The data operation unit 106 is controlled by microprograms, and executes the operation required for realizing the function of each instruction by means of registers and an arithmetic unit according to output information of the micro ROM unit 55. In the case where the operand to be operated is an address or an immediate value, the address or the immediate value calculated in the operand address calculation unit 54 is obtained by passing it through the external bus interface unit 57. In the case where the operand to be operated is in a memory outside the CPU, the bus interface unit outputs the address calculated in the address calculation unit 54 from the address output circuit 58, and the operand fetched from the memory outside the CPU is obtained through the data input/output circuit 59.

Arithmetic units include an ALU, a barrel shifter, a priority encoder, a counter, and a shift register. The registers and the main arithmetic units are connected through three buses, and one micro instruction for directing operation between registers is processed in two clocks (one step).

In the case where an access to the memory outside the CPU is required at the data operation, the address is outputted from the address output circuit 58 to the outside of the CPU through the external bus interface unit 57 by the direction of the microprogram, and the aimed data is fetched through the data input/output circuit 59.

In the case where data is stored in the memory outside the CPU, the address is outputted from the address output circuit 58 through the external bus interface unit 57, and simultaneously the data is outputted from the data input/output circuit 59 to the outside of the CPU. In order to efficiently perform operand store, a four-byte store buffer is installed in the data operation unit 56.

In the case where the data operation unit 56 obtains a new instruction address by processing a jump instruction or an exceptional processing, this is outputted to the instruction fetch unit 51 and the PC calculation unit 53.

(2.7) External Bus Interface Unit

The external bus interface unit 57 controls communication through the external bus of the data processor of the present invention. All accesses to memories are performed in a clock-synchronized method, and can be performed in a minimum of two clock cycles (one step).

Access requests to memories are generated independently from the instruction fetch unit 51, the operand address calculation unit 54 and the data operation unit 56. The external bus interface unit 57 arbitrates these memory access requests. Furthermore, the access to the data located at the memory address striding over the alignment boundary of 32 bits (one word) which is the size of the data bus connecting the memory to the CPU is performed in a manner that striding over the word boundary is automatically detected in this block and the access is decomposed into memory accesses of two times.

This unit also performs conflict preventing processing and by-pass processing from the store operand to the fetch operand in the case where the operand to be pre-fetched and the operand to be stored are superposed.

(3) Pipeline Processing Mechanism

Figure 28:
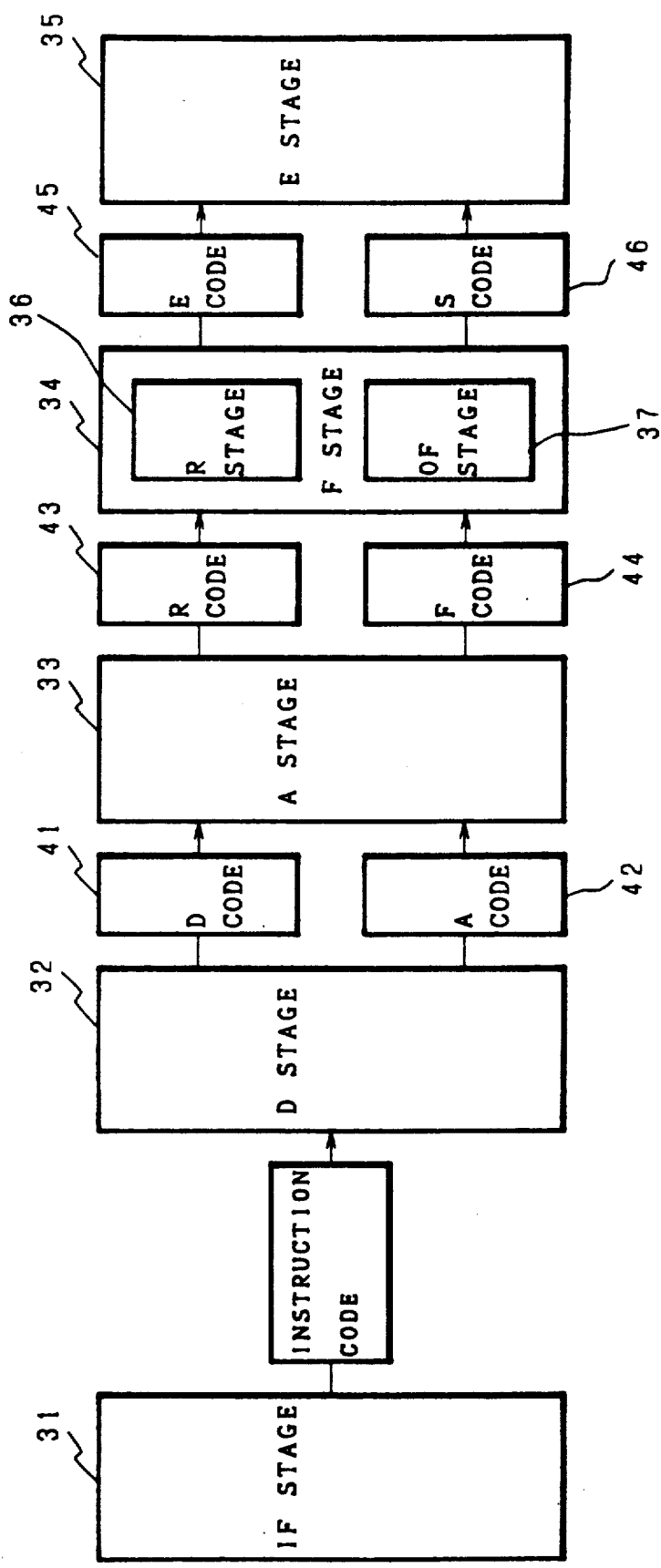
FIG. 28 is a block diagram showing a configuration of a pipeline function of the data processor of the present invention.

FIG. 28 is a schematic diagram showing a pipeline processing mechanism of the data processor of the present invention.

The basis of pipeline processing has a five-stage configuration which comprises an instruction fetch stage (IF stage) 31 for prefetching an instruction, a decoding stage (D stage) 32 for decoding the instruction, an operand address calculation stage (A stage) 33 for performing address calculation of an operand, an operand fetch stage (F stage) 34 consisting of a portion for performing micro ROM access (particularly called a R stage 36) and a portion for prefetch an operand (particularly called an OF stage 37), and an execution stage (E stage) 35 for executing an instruction.

The E stage 35 comprises a one-stage store buffer, and besides, in part of high-function instructions, the execution itself of the instruction is performed in a pipeline manner, and therefore, an actual effect of pipeline processing of five or more stages is obtainable.

Each stage operates independently from the other stages, and theoretically the five stages make perfectly independent operations. Each stage can perform one-time processing in a minimum of two clocks (one step). Accordingly, ideally, the pipeline processing progresses one after another on a two clock (one step) basis.

The data processor of the present invention comprises some instructions which cannot be processed only by the basic pipeline processing of one time such as an operation between memory and memory or a memory indirect addressing, but the data processor of the present invention is designed in such a manner that a balanced pipeline processing can be performed whenever possible for processing of these instructions. For the instruction having a plurality of memory operands, the pipeline processing is performed based on the number of memory operands by decomposing it into a plurality of pipeline processing units (step code) at the decoding stage.

On the decomposing method of the pipeline processing unit, detailed description is disclosed in the Japanese Patent Application Laid-Open No. 63-89932 (1988).

Information transferred from the IF stage 31 to the D stage 32 is an instruction code itself. Information transferred from the D stage 32 to the A stage 33 includes two kinds of information, one on operation designated by an instruction (called a D code 41) and the other on address calculation of operand (called an A code 42).

Information transferred from the A stage 33 to the F stage 34 includes an R code 43 comprising an entry address of a microprogram or a parameter of the microprogram and an F code 44 comprising an operand address and information on directing the method of access.

Information transferred from the F stage 34 to the E stage 35 is an E code 45 comprising operation control information and literal and an S code 46 comprising an operand or an operand address.

EIT detected in the stage other than the E stage 35 does not start the EIT processing until the code thereof reaches the E stage 35. This is because only the instruction processed in the E stage 35 is an instruction at the step of executing, and the instructions having been processed between the IF stage 31 and the F stage 34 do not reach the step of executing yet. Accordingly, for the EIT detected in the stage other than the E stage 35, the detection thereof is recorded in the step code, and it is only transmitted to the following stage.

(3.1) Pipeline Processing Unit

(3.1.1) Classification of Instruction Code Fields

The pipeline processing unit of the data processor of the present invention is determined by utilizing the feature of the format of an instruction set.

As described in Section (1), the instruction of the data processor of the present invention is a variable-length instruction of two-byte unit, and basically the instruction is configurated by repeating one to three times "a two-byte instruction base part + an addressing extension part of 0 to 4 bytes".

In many cases, the instruction base part comprises an operation code part and an addressing mode designating part, and in the case where index addressing or memory indirect addressing is required, "a two-byte chained addressing mode designating part + an addressing extension part of 0 to 4 bytes" is affixed by an arbitrary number in place of the addressing extension part. The extension part of two or four bytes which is peculiar to the instruction is also affixed lastly depending on the instruction.

The instruction base part comprises an operation code of an instruction, a basic addressing mode, literal and the like. The addressing extension part is any one of displacement, an absolute address, an immediate value and displacement of branch instruction. The extension part peculiar to the instruction comprises a register map, an immediate value designating of the I-format instruction and the like.

FIG. 29 is a schematic diagram showing the feature of the basic instruction format of the data processor of the present invention.

(3.1.2) Decomposition of Instruction into Step Codes

The data processor of the present invention performs the pipeline processing making the most of the feature of the above-mentioned instruction format.

In the D stage 32, a two-byte instruction base part + an addressing extension part of 0 to 4 bytes, "a chained addressing mode designating part + an addressing extension part", or an extension part peculiar to the instruction is processed as one decoding unit. The result of decoding of each time is called a step code, and in and after the A stage 33, this step code is taken as a unit of pipeline processing. The number of step codes is peculiar to each instruction, and in the case where the chained addressing mode designating is not performed, one instruction is divided into a minimum of one step code to a maximum of three step codes. In the case where the chained addressing mode designating is performed, the number of step codes is increased by a number as required. Note that this is performed only in the decoding step as described later.

(3.1.3) Control of Program Counter

All of the step codes existing on the pipeline of the data processor of the present invention have a possibility of being the ones for another instruction, and for this reason, the value of the program counter is controlled on a step code basis. All of the step codes have the program counter value of the instruction whereon that step code is based. The program counter value flowing through each stage of the pipeline while accompanying the step code is called a step program counter (SPC).

The SPC is transferred sequentially from one pipeline stage to the other.

(3.2) Processing of Each Pipeline Stage

As shown in FIG. 28, for convenience sake, names are given to the input and output step codes of each pipeline stage. The step codes perform processing relating to the operation codes, and include two series; a series becoming entry addresses of microprograms and parameters for the E stage 35 and a series becoming operands for microinstructions of the E stage 35.

(3.2.1) Instruction Fetch Stage

The instruction fetch stage (IF stage) 31 fetches an instruction from the memory or the branch buffer and input it to the instruction queue 1, and outputs an instruction code to the D stage 32. Input of the instruction queue 1 is performed in an aligned four-byte unit. In the case where an instruction is fetched from the memory, a minimum of two clocks (one step) are required for the aligned four bytes. In the case where the branch buffer hits, fetching can be made in one clock per aligned four bytes. The output unit of the instruction queue 1 is variable on a two-byte basis, and a maximum of six bytes can be outputted during two clocks. Immediately after a branch, two bytes of the instruction base part can also be transferred directly to the instruction decoder by by-passing the instruction queue 1.

Control of registering, clearing and the like of the instruction to the branch buffer, management of addresses of the instructions to be prefetched and control of the instruction queue are also performed in the IF stage 31.

The EITs detected in the IF stage 31 include bus access exception in fetching an instruction from the memory or an address conversion exception due to memory protection violation.

(3.2.2) Instruction Decoding Stage

The instruction decoding stage (D stage) 32 decodes an instruction code inputted from the IF stage 31. Decoding is performed by two clock (one step) basis using the first decoder 2 consisting of the FHW decoder, the NFHW decoder and the addressing mode decoder in the instruction decoding unit 52, and an instruction code of 0 to 6 bytes is consumed in the decoding processing of one-time (no instruction code is consumed in the outputting processing of the step code comprising the return address of the RET instruction). By one-time decoding, the control code which is the A code 42 as address calculation information, address modification information, the control code which is the D code 41 as the result of intermediate decoding of the operation code, and eight-bit literal information are inputted to the A stage 33.

In the D stage 32, control of the PC calculation unit 53 of each instruction, branch prediction processing, prebranch processing for the prebranch instruction and outputting processing of the instruction code from the instruction queue 1 are also performed.

The EITs detected in the D stage 32 include a reserved instruction exception and an odd address jump trap at prebranch. Various EITs transferred from the IF stage 32 are also transferred to the A stage 33 through processing of encoding into the step code.

In the D stage 32, when chained addressing mode is processed, the base instruction part of two bytes is processed as one decoding unit to generate D code 41 and A code 42, and "chained addressing mode designating part+addressing extension part" is processed as one decoding unit to generate D code 41 and A code 42.

(3.2.3) Operand Address Calculation Stage

Processing functions of the operand address calculation stage (A stage) 33 are roughly divided into two parts. One is processing for post-decoding of the operation code using the second decoder 3 of the instruction decoding unit 52 and the other is for calculation of operand address in the operand address calculation unit 54.

The post-decoding processing of the operation code inputs the D code 41 and outputs the R code 43 comprising write reserve of register and memory, entry address of microprogram and parameters for microprogram. In addition, the write reserve of the register or memory is for preventing a wrong address calculation by re-writing the content of the register or memory referred in the address calculation with the instruction preceding on the pipeline.

To avoid a dead lock, the write reserve of the register or memory is performed on an instruction basis rather than on a step code basis.

On the write reserve to the register or memory, detailed description is disclosed in the Japanese Patent Application No. 62-144394 (1987).

The operand address calculation processing inputs the A code 42, performs addition in the operand address calculation unit 54 according to the A code 42 or performs address calculation by combining memory indirect reference, and outputs the result of the calculation as the F cord 44. At this time, conflict check is done in reading-out of the register and the memory attending on the address calculation, and if a conflict is indicated because the preceding instruction has not completed the writing processing to the register or the memory, the processing waits until the preceding instruction completes the write processing in the E stage 35. Checking is made for whether or not the operand address and the address of memory indirect reference can enter the I/O area mapped in the memory.

The EITs detected in the A stage 33 include reserved instruction exception, privilege instruction exception, bus access exception, address conversion exception and debugging trap generated by an operand break point hit at memory indirect addressing. When it is indicated that the D code 41 or the A code 42 itself has caused EIT, the A stage 33 does not perform address calculation processing for that code, and that EIT is transmitted to the R code 43 and the F code 44.

In the case where processing of the chained addressing mode is performed in the A stage 33, first decoding processing is performed based on the D code 41 generated by the instruction base part in the D stage 32, and the R code 43 is generated, and the second decoder 3 retains the R code 43 until the F code 44 is generated.

The operand address calculation unit 54 retains an interim result of address calculation based on the A code 42 generated by the instruction base part in the d stage 32. Next, in the D code 41 generated by the "chained addressing mode designating part+addressing extension part" in the D stage 32, only EIT information in the D stage 32 is valid, and therefore decoding processing by the second decoder 3 is not performed, and whether or not an EIT has occurred in the D stage is detected. Furthermore, based on the A code 42 generated by the "chained addressing mode designating part+addressing extension part" in the D stage 32 and on the abovedescribed interim result of address calculation, address calculation and memory indirect reference are performed if instructed, and the processing is repeated by inputting the D code 41 and the A code 42 which have been generated by the next "chained addressing mode designating part+addressing extension part" until the address calculation is completed. Then, when the address calculation is completed and the F code 44 is generated, it is outputted to the F stage 34 along with the R code 43 retained by the second decoder 3.

(3.2.4) Micro ROM Access Stage

Processing of the operand fetch stage (F stage) 34 is also divided roughly into two parts. One is access processing of the micro ROM, particularly called the R stage 36. The other is operand prefetch processing, particularly called the OF stage 37. The R stage 36 and the OF stage 37, which do not necessarily operate at the same time, operate independently depending on whether or not the memory access right can be acquired.

The micro ROM access processing which is the processing of the R stage 36 is the micro ROM access and micro instruction decoding processing for generating the E code 45 which is an execute control code used for execution in the following E stage 35 for the R code 43. In the case where processing for one R code 43 is decomposed into two or more microprogram steps, the micro ROM is used in the E stage 35, and the following R code 43 waits for micro ROM access. The micro ROM access to the R code 43 is performed when the last micro instruction is executed in the preceding E stage 35. In the data processor of the present invention, almost all of the basic instructions are executed in one microprogram step, therefore, there are many actual cases that the micro ROM access to the R code 43 is performed one after another.

There is no EIT to be detected anew in the R stage 36.

When the R code 43 indicates the EIT of instruction processing re-execution type, the microprogram for that EIT processing is executed, and therefore the R stage 36 fetches the micro instruction according to the R code 43. In case where the R code 43 specifies an odd address jump trap, the R stage 36 transmits it through the E code 45. This is for prebranch, and in the E stage 35, if no branch is made in that E code 45, an odd address jump trap is generated with the prebranch being to be effective.

(3.2.5) Operaned Fetch Stage

The operand fetch stage (OF stage) 37 performs the operand prefetch processing among the above-mentioned two processings performed in the F stage 34.

The operand prefetch processing inputs the F code 44 and outputs the fetched operand and the address thereof as the S code 46. One F code 44 may stride over the word boundary, but designates operand fetching of four bytes or less. The F code 44 also comprises designating of whether or not access to the operand is to be performed, and in the case where the operand address itself or the immediate value calculated in the A stage 33 is transferred to the E stage 35, no operand prefetch is performed, and the content of the F code 44 is transferred as the S code 46. In the case where the operand intended to be prefetched coincides with the operand intended to be write-processed in the E stage 35, no operand prefetching is performed from the memory, but being performed by by-passing it. For the I/O area, the operand prefetch is delayed, and the operand fetch is performed only after all the preceding instructions have been completed.

The EITs detected in the OF stage 37 include a bus access exception, an address conversion exception, and a debugging trap generated by a break point hit to the operand prefetch. When the F code 44 specifies an EIT other than the debugging trap, it is transferred to the S code 46, and no operand prefetch is performed. When the F code 44 specifies a debugging trap, the same processing as the case where no EIT is specified for that F code 44 is performed, and the debugging trap is transmitted to the S code 46.

(3.2.6) Execution Stage

The execution stage (E stage) 35 operates with the E code 45 and the S code 46 taken as inputs. This E stage 35 is a stage for executing instructions, and the whole processings performed in the stages before and in the F stage 34 are pre-processings for the E stage 35. In the case where a jump instruction is executed in the E stage 35 or the EIT processing is started, all the processings from the IF stage 31 to the F stage 34 are disabled. The E stage 35 is controlled by microprograms, and the instruction is executed by executing a series of microprograms starting with the entry address of microprogram indicated in the R code 43.

Read of the micro ROM and execution of the microinstruction are performed in a pipeline manner. Accordingly, in the case where a branch takes place in the microprogram, a gap (blank) of one microstep is generated. The E stage 35 can also perform pipeline processing of an operand store of four bytes or less and the following microinstruction execution by utilizing the store buffer in the data operation unit 56.

In the E stage 35, the write reserve to the register and the memory performed in the A stage 33 is released after write of the operand.

In the case where a conditional branch instruction generates a branch in the E stage 35, the branch prediction for that conditional branch instruction has been wrong, and therefore rewriting of the branch history is performed.

The EITs detected in the E stage 35 include bus access exception, address conversion exception, debugging trap, odd address jump trap, reserve function exception, wrong operand exception, reserve stack format exception, zero division trap, unconditional trap, conditional trap, delay context trap, external interruption, delay interruption, reset interruption and system faults.

The EITs detected in the E stage 35 are all EIT-processed, but the EITs which are detected between the IF stage 31 and the F stage 34 before the E stage and are reflected in the R code 43 or the S code 46 are not necessarily EIT-processed. All the EITs which are detected among from the IF stage 31 to the F stage 34, but do not reach the E stage 35 because the preceding instruction has executed a jump instruction in the E stage 35 or the like are all canceled. The instruction having caused that EIT is assumed to have not been executed from the beginning.

The external interruption and the delayed interruption are accepted directly to the E stage 35 at a pause of the instruction, and necessary processing is executed by microprograms. Processings of other various EITs are performed by microprograms.

(3.3) Status Control of Each Pipeline Stage

Each stage of the pipeline has an input latch and an output latch, and is based on operation independent of other stages. Each stage starts the next processing after such whole processes as the one-preceding processing has been completed, the result of that processing has been transferred from the output latch to the input latch of the next stage, and all input signals required for the next processing have been prepared in the input latch of the stage of its own.

This means that each stage starts the next processing after such whole processes as all the input signals to the next processing outputted from the one-preceding stage are enabled, the result of the current processing is transferred to the input latch of the post-stage, and the output latch becomes empty.

It is required that all input signals are prepared at a timing with one clock before the operation start in each stage. If the input signals are not all prepared, that stage is put in the waiting state (input waiting). If transfer from the output latch to the input latch of the next stage is done, it is required that the input latch of the next stage is in the empty state, and when the input latch of the next stage is not empty, the pipeline stage is also put in the waiting state (output waiting). If the required memory access right cannot be acquired, or wait is inserted into the memory access under processing, or another pipeline conflict occurs, the processing itself of each stage is delayed.

(4) Detailed Description on Deferred Addressing

The chained addressing mode which is one of the memory relative indirect addressing modes includes the register based chained addressing mode, the PC base chained mode, and the absolute base chained mode as described in (1. 4. 2).

Figure 30:
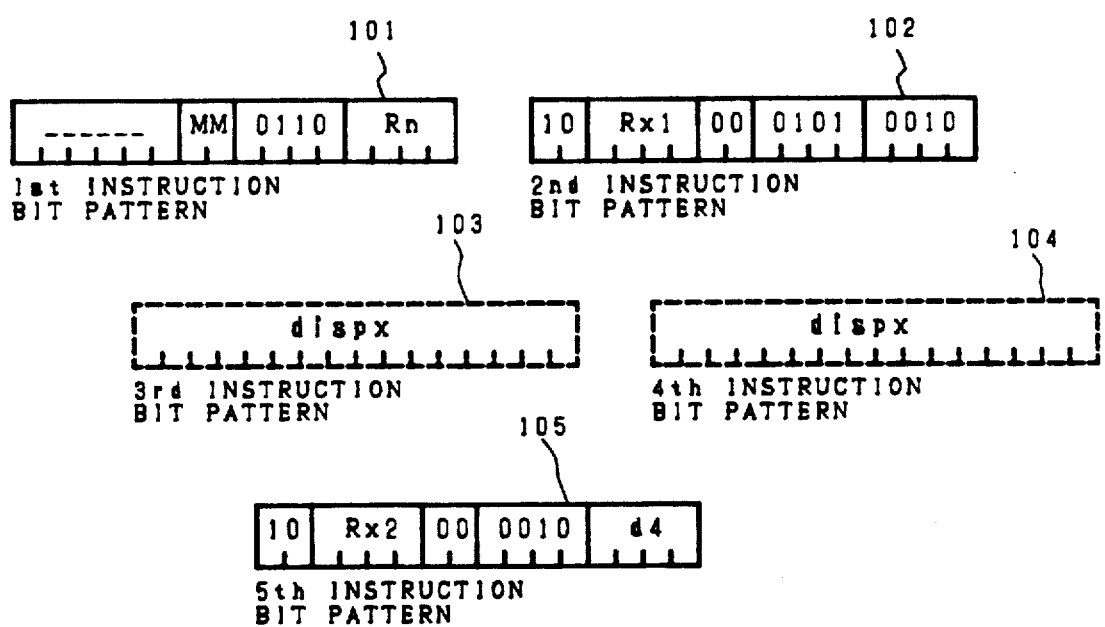
FIG. 30 is a schematic diagram showing a bit pattern used in the data processor of the present invention.

Here, description is made on the case of the general-type one-operand instruction of a two-stage chained addressing mode wherein the addressing mode is the register base chained addressing mode as shown in FIG. 30.

A first instruction bit pattern 101 is the G1-format instruction as shown in FIG. 8, and the base addressing mode designating field is designated to the register base chained addressing mode as shown in FIG. 21. Symbol Rn designates a base register.

A second bit pattern 102 is two bytes of the extension part which is the format of the chained addressing mode as shown in FIG. 24. The content of this extension part shows continuity of the chained addressing mode, presence of memory indirect reference and use of $R \times 1$ as an index with scaling set to 4. The value of dispx of 32 bits is taken as the displacement value. The second instruction bit pattern is followed by a displacement of 32 bits which is composed of a third instruction bit pattern 103 of 16 bits and a fourth instruction bit pattern 104 of 16 bits. The following fifth instruction bit pattern 105 is an extension part which is the format of the chained addressing mode like the abovedescribed. This extension part shows completion of address calculation, absence of memory indirect reference, use of $R \times 2$ as an index with scaling set to 2 and taking the value codeextended by quadrupling the value of d4 as a displacement value. Eventually, address calculation of an operand is performed as follows.

mem[Rn+dispx+Rx1*4]+d4*4+R×2*2→address of operand

Note that mem[A] designates the memory content of an address A.

(5) Function Block Configuration of Addressing Mode Processing Unit

Figure 31:
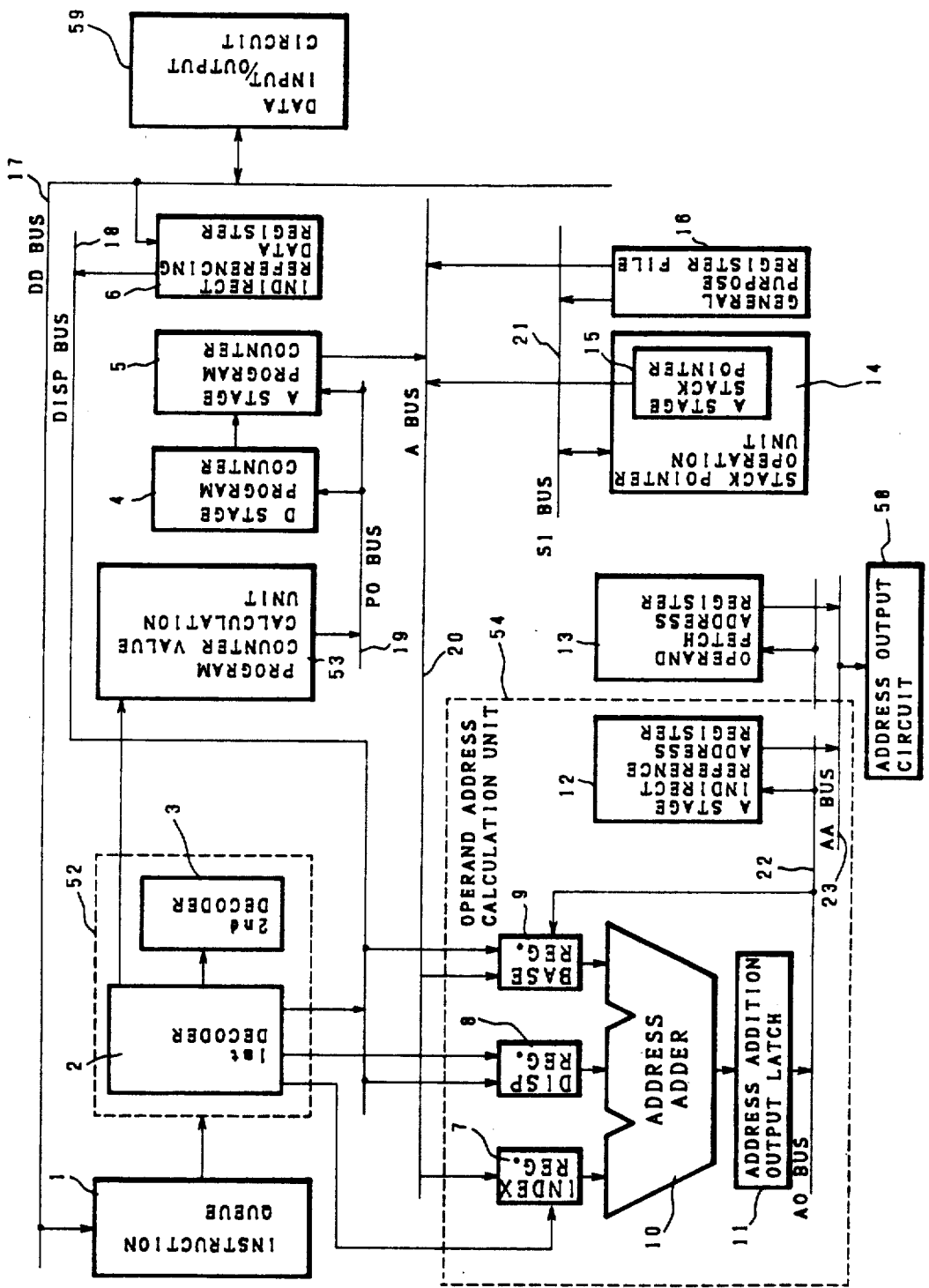
FIG. 31 is a block diagram showing a detail configuration of an addressing mode processing unit of the data processor of the present invention.

FIG. 31 is a detailed configuration diagram of an addressing mode processing unit of the data processor of the present invention.

An instruction queue 1 comprised in the instruction fetch unit 51 prefetches an instruction, and outputs an instruction code to the instruction decoding unit 52.

The first decoder 2 comprised in the instruction decoding unit 52 consists of the FHW decoder, the NFHW decoder, an addressing mode decoder, a D code-A code generating circuit and a controlling circuit thereof, and performs decoding processing of a first stage. Among the results of the first-stage decoding, information relating to operand address calculation is outputted to the operand address calculation unit 54, information relating to a second-stage decoding processing is outputted to a second decoder 3, and information relating to PC calculation is outputted to the PC calculation unit 53, respectively.

The second decoder 3 comprised in the instruction decoding unit 52 inputs the output of the first decoder 2 and performs the second-stage decoding. Among the results of the second-stage decoding, information relating to operation in the data operation unit 56 is outputted to the micro ROM unit 55, and information relating to operand fetching is outputted to the operand address calculation unit 54, respectively.

A D stage program counter 4 is a program counter used in the D stage 32, and the value calculated in the PC calculation unit 53 is inputted through a PO bus 19.

An A stage program counter 5 is a program counter used in the A stage 33, and is connected to the D stage program counter 4, the PO bus 19 and an A bus 20.

An indirect reference data register 6 stores indirect reference data from a memory through the data input-/output circuit 59 and a DD bus 17 when memory indirect reference is made. This indirect reference data register 6 comprises an arranging circuit.

An index register 7 of the operand address calculation unit 54 inputs an index value from the A bus 20 at address calculation, and performs scaling by using a scale value outputted from the first decoder 2.

A displacement register 8 of the operand address calculation unit 54 is connected to a DISP bus 18, and a displacement value is inputted at the address calculation necessitating displacement such as immediate value, absolute or register relative addressing.

A base register 9 of the operand address calculation unit 54 is connected to the A bus 20, and the content of the register at the register indirect or register relative addressing mode is inputted. The base register 9, connected to the DISP bus 18 and an AO bus 22, stores data from the memory in the case of the chained addressing mode with memory indirect reference, and the result of calculation in the case of continuing address calculation without memory indirect reference.

An address adder 10 of the operand address calculation unit 54 adds values of the index register 7, the displacement register 8 and the base register 9.

An address addition output latch 11 of the operand address calculation unit 54 is an output latch for outputting the result of addition of the address adder 10, and is connected to the AO bus 22.

An A stage indirect reference address register 12 is connected to the AO bus 22, and sets an address at indirect reference, and that address enters the address output circuit 58 through an AA bus 23, and indirect reference is performed.

An operand fetch address register 13 is connected to the AO bus 22, and an address for perform prefetching of an operand and an immediate value are entered. When prefetching of an operand is performed, a fetched address is outputted to the address output circuit 58 through the AA bus 23.

An SP operation unit 14 calculates the value of the stack pointer of each stage.

The value of an A stage stack pointer 15 of the SP operation unit 14 is used when the address calculation relating to PUSH-POP is required in the A stage 33. The A stage stack pointer 15 is connected to the A bus 20.

A general-purpose register file 16 is connected to a S1 bus 21 and the A bus 20.

The DD bus 17 is connected to an external data bus through the data input/output circuit 59, and is connected to the instruction queue 1 and the indirect reference data register 6.

The DISP bus 18 used in the D stage is a bus for transferring the displacement and the immediate value outputted from the instruction queue 1 to the operand address calculation unit 54. The DISP bus 18 is used for transferring the value fetched from the memory to the operand address calculation unit 54 at the memory indirect addressing mode.

The PO bus 19 is connected to program counters between each stage.

The A bus 20, used in the A stage 33, is a bus for transferring the value of the register of the general-purpose register file 16 to the operand address calculation unit 54.

The S1 bus 21 is connected to the SP operation unit 14, the general-purpose register file 16 and the data operation unit 56.

The AO bus 22, used in the A stage 33, is a bus for transferring the value of the address addition output latch 11 to the base register 9, the A stage indirect reference address register 12 and the operand fetch address register 13.

The AA bus 23 is used for outputting the address values shown by the A stage indirect reference address register 12 and operand fetch address register 13 in order to transfer to the address output circuit 58. It is used when fetching of a memory indirect reference address in the A stage 33 or fetching of an operand in the F stage 34 is performed.

Figure 32:
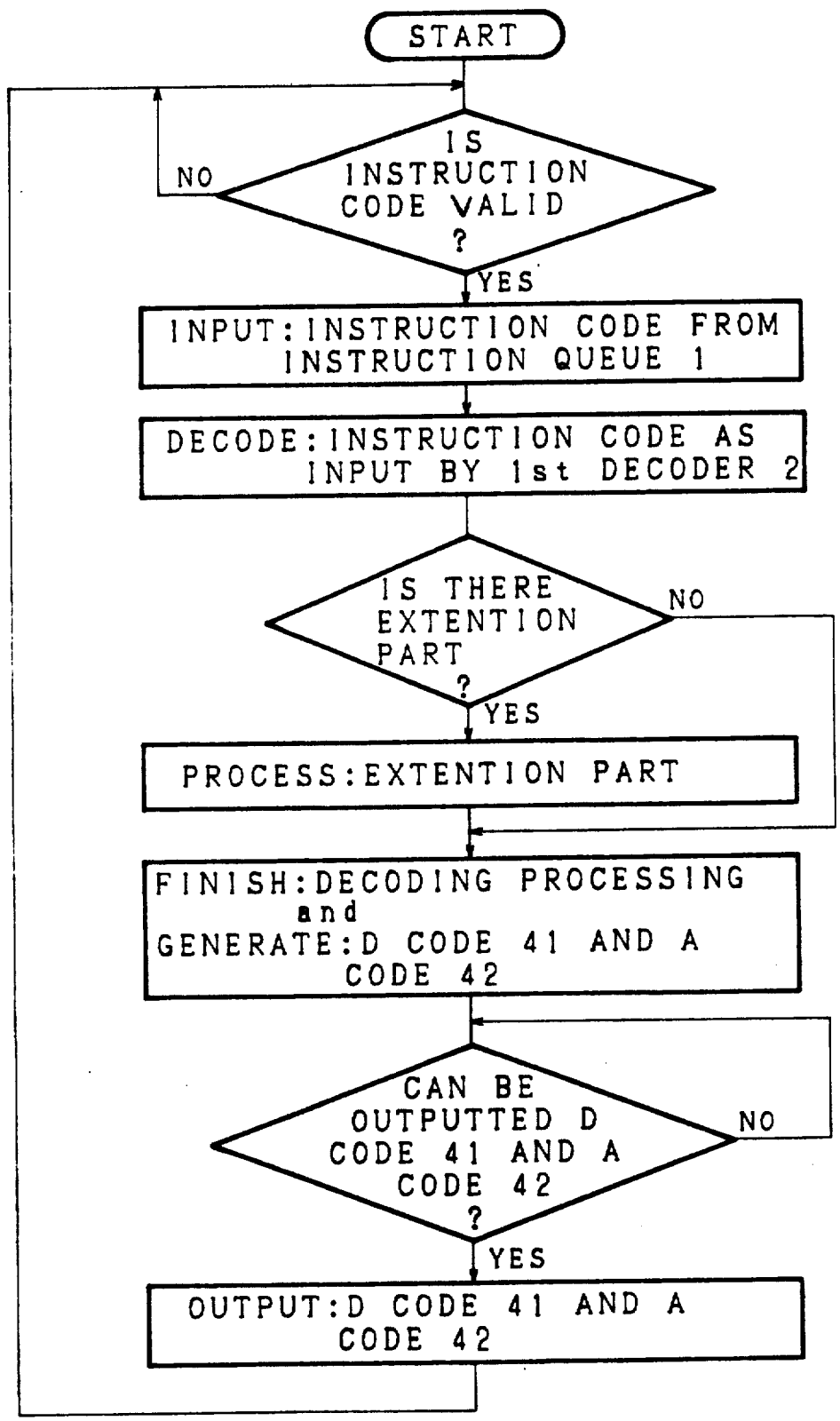
FIG. 32 is a flow chart showing a processing procedure at a decoding (D) stage.

(6) Detailed Description on Pipeline Operation for Instruction Performing Deferred Addressing FIG. 32 is a flowchart showing operation of the D stage 32.

Figure 33:
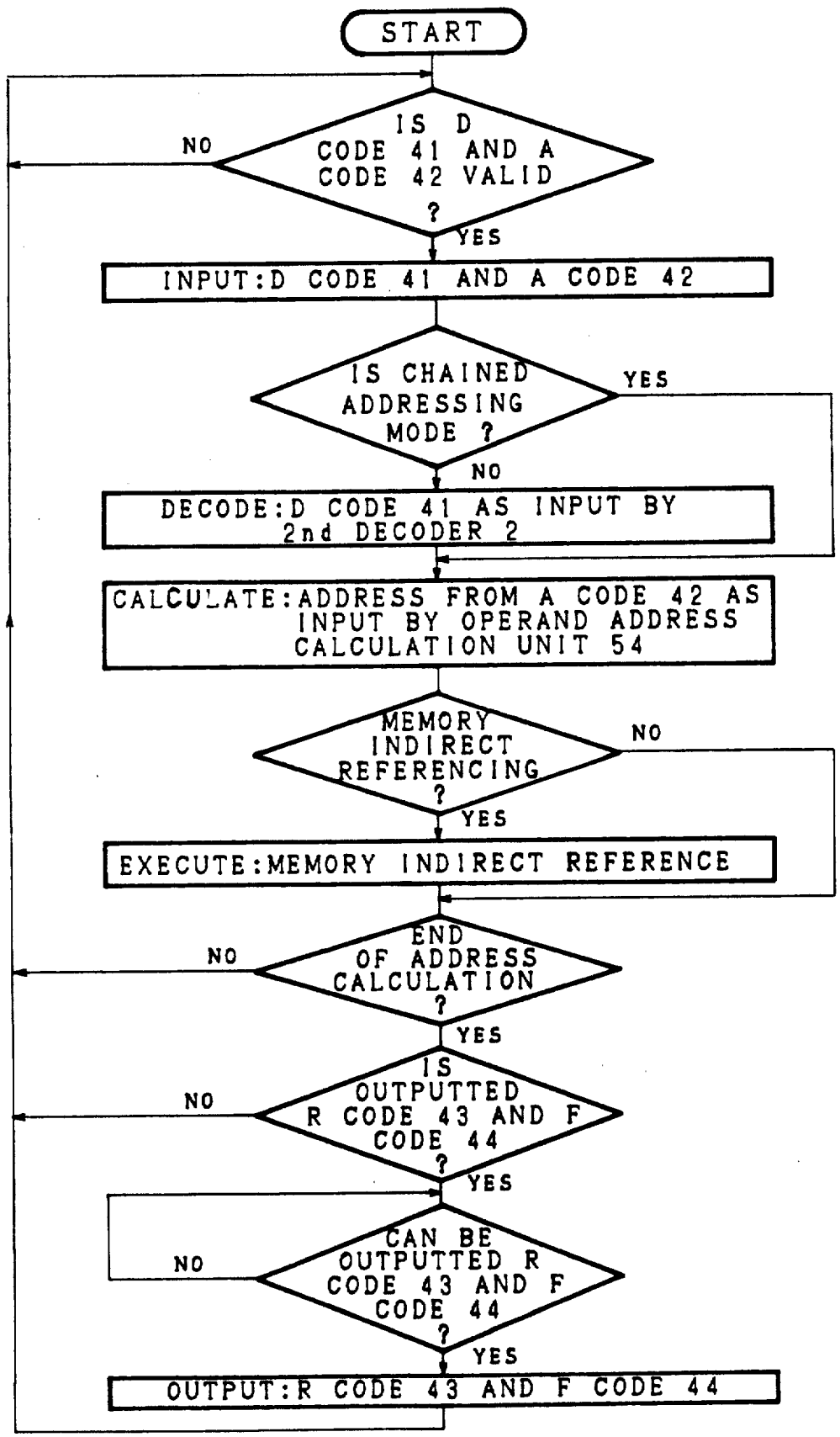
FIG. 33 is a flow chart showing a processing procedure at an operand address calculation (A) stage.

FIG. 33 is a flowchart showing operation of the A stage 33.

When the first through the fifth instruction bit patterns 101-105 are present in the instruction queue 1, and decoding-processing of the preceding instructions has been completed in the D stage 32, and the D code 41 and the A code 42 which are the results of the processing are transferred to the A stage 33, the D stage 32 takes-in an instruction code from the IF stage 31, and starts processing. Operation in the D stage 32 is such that the first decoder 2 takes-in 16 bits of the first instruction bit pattern 101 from the instruction queue 1, and starts decoding processing. As a result, a step code of a set of the D code 41 and the A code 42 (hereinafter referred to as the first DA step code) is generated. At this time, the A stage 33 completes processing of the step code of the preceding instruction, and transfers the result of the processing to the F stage 34, and is in the state of waiting for the next step code. The A stage 33 takes-in the first DA step code from the D stage 32, and starts processing. Operation of the A stage 33 at this time is as follows.

The second decoder 3 starts processing by using the D code 41 of the first DA step code. Along therewith, the operand address calculation unit 54 uses the A code 42 of the first DA step code, and the content of the register designated by Rn is taken into the base register 9 from the general-purpose register file 16 through the A bus 20. At this time, the displacement register 8 and the index register 7 are cleared. The register values of the base register 9, the displacement register 8 and the index register 7 are added by the address adder 10, and the result of addition is latched by the address addition output latch 11, and is taken into the base register 9 through the AO bus 22. In the content of the first DA step code, the addressing mode is the chained addressing mode, but if not being the chained addressing mode, after completing decoding processing by the second decoder 3 and address calculation by the operand address calculation unit 54 in the A stage 33, a step code of a set of the R code 43 and the F code 44 is generated. However, when the addressing mode is the chained addressing mode, the R code 43 and the F code 44 are not generated, and the required value is retained in the A stage 33. Actually, the value of the output latch 3 of the first decoder 2 is retained, and take-in of the next step code is waited.

Here in the D stage 32, when the first DA step code is transferred, 16 bits of the second instruction bit pattern 102 are taken in from the IF stage 31, and processing is started. Operation in the D stage 32 at this time is such that the first decoder 2 takes-in 16 bits of the second instruction bit pattern 102 from the instruction queue 1, and starts decoding processing. As a result of decoding, it also takes-in the displacement value of 32 bits of the third and the fourth instruction bit patterns 103 and 104 in FIG. 30, and generates a second set of the D code 41 and the A code 42 (hereinafter referred to as the second DA step code).

Then, in the A stage 33, the second DA step code is taken-in from the D stage 32, and processing is started. Operation of the A stage 33 at this time is as follows.

The second decoder 3 starts processing by using the D code 41 of the second DA step code. At this time, decoding processing is not performed, and only EIT information in the D code 41 is detected. along therewith, the operand address calculation unit 54 uses the A code 42 of the second DA code, the content of the register designated by R×1 is taken into the index register 7 from the general-purpose register file 16 through the A bus 20, and is quadrupled by the scale value=10 comprised in the second DA step code. A displacement value of 32 bits is taken into the displacement register 8. The register values of these three registers, namely, the index register 7, the displacement register 8 and the base register 9 are added by the address adder 10. At this time, the result of the one-preceding operation (the value of the base register 9 in this case) is retained in the base register 9. These results of addition are latched by the address addition output latch 11, and are stored in the A stage indirect reference address register 12 through the AO bus 22, and also pass through the AA bus 23, going to the memory indirect reference via the address output circuit 58.

After transferring the second DA step code, the D stage 32 takes-in 16 bits of the fifth instruction bit pattern from the IF stage 31, and starts processing. Operation of the D stage 32 at this time is such that the first decoder 2 starts decoding processing, and the displacement is code-extended to 32 bits by quadrupling the value of d4, and a third set of the D code 41 and the A code 42 (hereinafter referred to as the third DA step code) is generated.

In the A stage 33, indirect reference data as a result of performing memory indirect reference is entered into the direct reference data register 6 via the data input/output circuit 59 and the DD bus 17. Then, the third DA step code is taken in, and processing is started by using the D code 41 of the third DA step code. At this time, no decoding processing is performed, and only EIT information in the D code 41 is detected. At the same time, the content of the register designated by R×2 using the A code 42 of the third DA step code is taken into the index register 7 from the general-purpose register file 16 through the A bus 20, and is doubled by the scale value=01 comprised in the third DA step code. The displacement value sign-extended to 32 bits is taken into the displacement register 8. The value of the indirect reference data register 6 is taken into the base register 9 via the DISP bus 18. The values of these three registers, namely, the index register 7, the displacement register 8 and the base register 9 are added by the address adder 10, and the result of addition is latched by the address addition output latch 11. The processing in the A stage ends with completing address calculation by this step code, and the value of output latch of the second decoder 3 and the value of the address addition output latch 11 are transferred to the F stage 34 as a step code of a set of the R code 43 and the F code 44. At this time, an operand fetch address comprised in the F code 44 is taken into the operand fetch address register 13 through the AO bus 22, and operand fetching is started through the address output circuit 58.

In the case where the base addressing mode of the general-type one-operand instruction is the PC base chained addressing mode, in designating the base address, the general-purpose register number in the case of the register base chained addressing mode becomes the program counter, and the value of the A stage program counter 5 is taken into the base register 9 through the A bus 20. The following processings are like the case of the register base chained addressing mode. When the base addressing mode of the general-type one-operand instruction is the absolute base chained addressing mode, the base address is 0, and the base register 9 is cleared, and the following processings are performed likewise.

In this embodiment, the case of the general-type one-operand instruction is shown, and processings in the case of the general-type two-operand instruction are also performed likewise.

Thus, in the case of the instruction using the chained addressing addressing mode, in the D stage 32, the "instruction base part+addressing mode designating part"

and the "chained addressing mode designating part-+addressing extension part" are processed as one decoding unit respectively, and a step code of a set of the D code 41 and the A code 42 is generated. In the case of the example described here, three sets of step codes are generated, and the step code of the "chained addressing mode designating part+addressing extension part" does not comprise information relating to instruction execution, and therefore this step code is not required to be transferred to the F stage 34 and thereafter. Accordingly, the step code of the "chained addressing mode designating part+addressing extension part" generated in the D stage 32 is merged into the step code of the "instruction base part+addressing mode designating part" in the A stage 33. Then, in the F stage 34 and thereafter, processing is performed as one step code.

FIG. 34 is a flowchart of step codes on the pipeline of the example described here. Operation of the A stage 33 at a time 3 indicates address calculation by the step codes generated by the second, the third and the forth instruction bit patterns 102, 103 and 104. Operation of the A stage 33 at a time 4 indicates memory indirect reference by the step codes generated by the second, the third and the fourth instruction bit patterns 102, 103 and 104. Operation of the A stage 33 at a time 5 shows execution of a step code generated by fifth instruction bit pattern 105. This means that the step codes generated by the second, the third, the fourth and the fifth instruction bit patterns 102, 103, 104 and 105 are merged into the step code of the first instruction bit pattern 101 in the A stage 33, and the step code generated resultingly is processed in the F stage 34.

Figure 35:
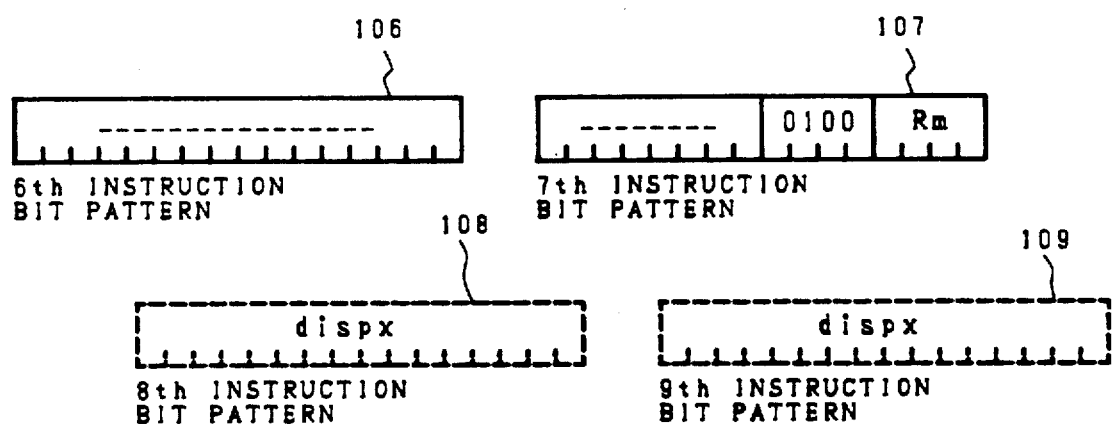
FIG. 35 is a schematic diagram showing another example of a bit pattern used in the data processor of the present invention.

(7) Detailed Description on Instruction of Four or More Bytes without Information for Address of Operand in the First Two Bytes of Instruction Bit Pattern Description is made on processing of instruction bit patterns as shown in FIG. 35.

Instructions as shown in FIG. 35 which are processed by the data processor of the present invention include an instruction (SHXL instruction) which shifts a 32-bit length destination operand indicates by the addressing mode to the left by one bit, packs the content of a X-flag into the LSB of destination, and enters bits overflowing the MSB into the X-flag, and an instruction (SHXR instruction) which shifts a 32-bit length destination operation indicates by the addressing mode to the right by one bit, packs the content of the X-flag into the MSB of destination, and enters bits overflowing the LSB into the X-flag.

In the example in FIG. 35, there are cases where there is an extension part peculiar to the instruction after the ninth instruction bit pattern. This instruction includes an instruction of stack frame formation and jump to subroutine for high-class language (ENTER instruction) and an instruction of return to subroutine for high-class language and parameter release (EXITD instruction).

A sixth instruction bit pattern 106 as shown in FIG. 35 consists of only an instruction base part. A seventh instruction bit pattern 107 consists of a "instruction base part+addressing mode designating part". The bit pattern of the extension part of the addressing mode is taken as an eighth instruction pattern 108 and a ninth instruction pattern 109. The base addressing mode designating part is designated to the register relative indirect mode as shown in FIG. 15.

Here the sixth through the ninth instruction bit patterns 106-109 are present in the instruction queue 1, and decoding processing of the preceding instructions in the D stage 32 is completed, and the D code 41 and the A code 42 which are the results of that processing are transferred to the A stage 32, so that the D stage 32 takes-in an instruction code from the IF stage 31, and starts processing. Operation in the D stage 32 is such that the first decoder 2 takes-in 16 bits of the sixth instruction bit pattern 106 from the instruction queue 1, and starts decoding operation. As a result, a step code of a set of the D code 41 and the A code 42 (hereinafter referred to as the sixth DA step code) is generated. At this time, where the A stage 33 completes processing of the step code of the preceding instruction, transfer the result of that processing to the F stage 34, and is in the state of waiting for the next step code, the A stage 33 takes in the sixth DA step code from the D stage 32, and starts processing. Operation of the A stage 33 at this time is as follows. The second decoder 3 starts processing by using the D code 41 of the sixth DA step code. Since the A code 42 of the sixth DA step code is invalid, the operand address calculation unit 54 performs nothing. As a result of decoding, the R code 43 and the F code 44 are not generated by this step code, and take-in of the next step code is waited.

In the D stage 32, when the sixth DA step code is transferred, 16 bits of the seventh instruction bit pattern 107 in FIG. 35 is taken-in from the IF stage 31, and processing is started.

Operation of the D stage at this time is such that the first decoder 2 takes-in 16 bits of the seventh instruction bit pattern 107 from the instruction queue 1, and starts decoding processing.

As a result of decoding, displacement values of 32 bits of the eighth instruction bit pattern 108 and the ninth instruction bit pattern 109 in FIG. 35 are taken-in, and a seventh set of the D code 41 and the A code 42 (hereinafter referred to as the seventh DA step code).

In the D stage 33, the seventh DA step code is taken-in from the D stage 32, and processing is started. Operation of A stage 33 at this time is as follows. The second decoder 3 starts processing by using the D code 41 of the seventh DA code. Attending thereon, the operand address calculation unit 54 starts decoding processing by using the A code 42 of the seventh DA step code. Operation of the operand address calculation unit 54 at that time is such that the content of the register designated by Rm is taken from the general-purpose register file 16 into the base register 9 through the A bus 20, and a displacement value of 32 bits is taken into the displacement register 8. At this time, the index register 7 is cleared. The register values of these three registers, namely, the index register 7, the displacement register 8 and the base register 9 are added by the address adder 10, and the result of addition is latched by the address addition output latch 11. With this, processing in the A stage is completed, and a set of the R code 43 and the F code 44 is generated, being transferred to the F stage 34.

Thus, an instruction of four or more bytes which has no information for the address of operand in the first two bytes of the instruction bit pattern is divided into two or more step codes in the D stage 32. However, in the A stage 33, the step code of the instruction bit pattern having no information for the address of operand is merged into the step code of the following instruction. Then, processing in and after the F stage 34 can be performed as one step code.

FIG. 36 is a flowchart of step codes on the pipeline of the example described here. Processing of the F stage 34 at a time 4 shows that the step code of the sixth instruction bit pattern 106 is merged into the step code generated by the seventh, the eighth and the ninth instruction bit patterns 107, 108 and 109 in the A stage 33, and resultingly, the generated step code is processed in the F stage 34.

As described above, in the case where the consecutive processing of evaluating the address value by adding the index value to the base value after completing calculation thereof as is in the case with the chained addressing mode, the data processor of the present invention makes it possible to perform memory indirect reference and address calculation of an arbitrary number of times with limited hardware.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data processor for processing an instruction by a pipeline processing mechanism, the instruction including a first operation information designating part for designating a part of an operand operation content, a second operation information designating part for designating a part of the operand operation content, and an addressing mode designating part for specifying information relating to an operand address, comprising:

a first pipeline stage for decoding a particular instruction by dividing said particular instruction into a plurality of unit decoding processings and for outputting a decoding result of each unit decoding processing, said first pipeline stage decoding said first operation information designating part as a first unit decoding processing to output the first unit decoding result, and decoding said second operation information designating part and said addressing mode designating part as a second unit decoding processing to output the second unit decoding result;

a second pipeline stage for calculating the operand addresses according to each said decoding result to output said operand address and for successively merging a part of or all of a plurality of each said decoding results into a unit processing to output said operation information of an operand as a merged operation information, said second pipeline stage merging information relating to operand operation included in said first unit decoding result and said second unit decoding result into unit processing to output said operation information of an operand as a operand operation information, and for calculating an operand address according to said second unit decoding result to output said operand address; and a third pipeline stage which fetches an operand according to said operand address.

2. A method for processing an instruction having a first operation information designating part, a second operation information designating part and an addressing mode designating part, said processing method comprising the steps of:

providing a pipeline processing mechanism including a dividing and decoding pipeline stage, an operand address calculation and merging pipeline stage and an operand fetch pipeline stage responsive to said operand address;

dividing each instruction into a plurality of unit decoding processings;

decoding the first operation information designating part of each divided instruction at said dividing and decoding pipeline stage to provide a first unit decoding result;

decoding the second operation information designating part and the addressing mode designating part of each divided instruction at said dividing and decoding pipeline stage to provide a second unit decoding processing;

merging operand operation information from each said first unit decoding result and said second decoding result;

calculating an operand address responsive to said second unit decoding result; and fetching an operand responsive to said operand operation information and said operand address.

3. A pipelined data processor, comprising:

a first pipeline stage for decoding an instruction by dividing said instruction into a first processing unit and a second processing unit, with said first processing unit including a first operation information designating part of said instruction and said second processing unit including a second operation information designating part and an addressing mode designating part of said instruction, said first pipeline stage successively decoding said first processing unit and said second processing unit to produce successive first and second decoding results; and a second pipeline stage, coupled to said first pipeline stage, for calculating operand addresses responsive to each successive decoding result of said first stage, and for merging operand operation information of said first and said second decoding results into an operand operation information of said instruction, said second pipeline stage calculating an operand address for the instruction responsive to said merged operand operation information.

* * * * *